US011677075B2

(12) United States Patent
Takano et al.

(10) Patent No.: US 11,677,075 B2
(45) Date of Patent: Jun. 13, 2023

(54) CATHODE ACTIVE MATERIAL FOR LITHIUM ION SECONDARY BATTERY, METHOD FOR MANUFACTURING CATHODE ACTIVE MATERIAL FOR LITHIUM ION SECONDARY BATTERY, AND LITHIUM ION SECONDARY

(71) Applicant: Proterial, Ltd., Tokyo (JP)

(72) Inventors: Shuichi Takano, Tokyo (JP); Akira Gunji, Tokyo (JP); Hisato Tokoro, Tokyo (JP); Genei Nakajima, Tokyo (JP); Tatsuya Toyama, Tokyo (JP); Shin Takahashi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 16/644,114

(22) PCT Filed: Dec. 26, 2018

(86) PCT No.: PCT/JP2018/047888
§ 371 (c)(1),
(2) Date: Mar. 3, 2020

(87) PCT Pub. No.: WO2019/131779
PCT Pub. Date: Jul. 4, 2019

(65) Prior Publication Data
US 2020/0251733 A1 Aug. 6, 2020

(30) Foreign Application Priority Data
Dec. 27, 2017 (JP) .............................. JP2017-252400

(51) Int. Cl.
*H01M 4/525* (2010.01)
*H01M 10/0525* (2010.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .. H01M 4/525; H01M 4/505; H01M 10/0525; H01M 4/131; H01M 10/052;
(Continued)

(56) References Cited

U.S. PATENT DOCUMENTS 6,372,387 B1 * 4/2002 Kawakami ............ H01M 10/26
429/303
2004/0043300 A1 * 3/2004 Utsugi .............. H01M 10/0567
429/231.95
(Continued)

FOREIGN PATENT DOCUMENTS

CN 1493522 * 4/2005 ............. C01B 13/14
CN 105765770 A 7/2016
(Continued)

OTHER PUBLICATIONS

Yura et al. Espacenet Abstract JP 2014067546 Apr. 17, 2014.*
(Continued)

*Primary Examiner* — Jonathan G Jelsma
*Assistant Examiner* — Omar M Kekia
(74) *Attorney, Agent, or Firm* — Volpe Koenig

(57) ABSTRACT

Provided is a cathode active material for a lithium ion secondary battery in which the secondary particles constituting the powder have a high breaking strength and a good coatability, and a method for manufacturing same. The cathode active material for a lithium ion secondary battery includes a primary particle of a lithium composite compound; and secondary particles formed by an aggregation of primary particles, wherein a ratio between an average particle size of the primary particles and an average particle size
(Continued)

of the secondary particles is 0.006 or more and 0.25 or less, an amount of lithium carbonate is 0.4% by mass or less, and a breaking strength of the secondary particles is 30 MPa or more.

13 Claims, 5 Drawing Sheets

(51) Int. Cl.
*H01M 4/505* (2010.01)
*C01G 53/00* (2006.01)
*H01M 4/02* (2006.01)
*H01M 4/131* (2010.01)
*H01M 10/052* (2010.01)

(52) U.S. Cl.
CPC ........ *H01M 10/0525* (2013.01); *C01G 53/42* (2013.01); *C01P 2002/52* (2013.01); *C01P 2002/54* (2013.01); *C01P 2004/03* (2013.01); *C01P 2004/45* (2013.01); *C01P 2004/50* (2013.01); *C01P 2004/51* (2013.01); *C01P 2004/54* (2013.01); *C01P 2004/61* (2013.01); *C01P 2004/62* (2013.01); *C01P 2006/12* (2013.01); *C01P 2006/14* (2013.01); *C01P 2006/16* (2013.01); *C01P 2006/40* (2013.01); *H01M 4/131* (2013.01); *H01M 10/052* (2013.01); *H01M 2004/021* (2013.01); *H01M 2004/028* (2013.01); *Y02E 60/10* (2013.01)

(58) Field of Classification Search
CPC ...... H01M 2004/021; H01M 2004/028; C01G 53/50; C01G 53/42; C01P 2004/50; C01P 2004/45; C01P 2002/52; C01P 2004/54; C01P 2004/51; C01P 2004/62; C01P 2004/61; C01P 2006/16; C01P 2006/14; Y02E 60/10
USPC ........................................................ 429/223
See application file for complete search history.

(56) References Cited

U.S. PATENT DOCUMENTS

| | | | |
|---|---|---|---|
| 2004/0112456 A1 | 6/2004 | Bates et al. | |
| 2004/0173281 A1 | 9/2004 | Bates et al. | |
| 2005/0036900 A1 | 2/2005 | Bates et al. | |
| 2005/0158546 A1* | 7/2005 | Shizuka | H01M 4/0404 429/223 |
| 2005/0175897 A1 | 8/2005 | Jung et al. | |
| 2008/0241647 A1* | 10/2008 | Fukui | H01M 10/052 429/94 |
| 2008/0268340 A1* | 10/2008 | Kuwahara | H01M 4/485 429/223 |
| 2009/0119908 A1* | 5/2009 | Takeda | C01G 53/44 29/623.5 |
| 2015/0093641 A1 | 4/2015 | Mitsumoto et al. | |
| 2016/0099460 A1* | 4/2016 | Toyama | H01M 4/525 429/223 |
| 2016/0118656 A1 | 4/2016 | Nakayama et al. | |
| 2016/0156020 A1 | 6/2016 | Tokoro et al. | |
| 2016/0293952 A1 | 10/2016 | Kaneda et al. | |
| 2017/0125808 A1 | 5/2017 | Blangero et al. | |
| 2017/0133674 A1* | 5/2017 | Murphy | H01M 10/0587 |
| 2017/0256794 A1 | 9/2017 | Tani et al. | |
| 2017/0358799 A1 | 12/2017 | Gunji et al. | |
| 2018/0261840 A1 | 9/2018 | Tokoro et al. | |
| 2018/0316004 A1 | 11/2018 | Tokoro et al. | |
| 2018/0323428 A1 | 11/2018 | Nakayama et al. | |
| 2018/0366727 A1 | 12/2018 | Toyama et al. | |
| 2019/0181444 A1 | 6/2019 | Gunji et al. | |

FOREIGN PATENT DOCUMENTS

| | | | | |
|---|---|---|---|---|
| JP | 2000-323123 | * | 11/2000 | ............ H01M 10/05 |
| JP | 2006-515378 A | | 5/2006 | |
| JP | 2010-092706 A | | 4/2010 | |
| JP | 2010-192424 A | | 9/2010 | |
| JP | 2013-232318 A | | 11/2013 | |
| JP | 2014-067546 A | | 4/2014 | |
| JP | 2014067546 | * | 4/2014 | |
| JP | 2016-076470 A | | 5/2016 | |
| JP | 2016-110982 A | | 6/2016 | |
| JP | 2016110982 | * | 6/2016 | ............ H01M 4/525 |
| JP | 2016-149258 A | | 8/2016 | |
| JP | 2017-188293 A | | 10/2017 | |
| WO | 2014/189108 A1 | | 11/2014 | |
| WO | 2016-031677 A1 | | 3/2016 | |
| WO | 2017/082268 A1 | | 5/2017 | |
| WO | 2017/208703 A1 | | 12/2017 | |
| WO | 2017/208894 A1 | | 12/2017 | |
| WO | 2017/213002 A1 | | 12/2017 | |

OTHER PUBLICATIONS

Tokoro et al. JPO Abstract JP 2016110982 Jun. 20, 2016.*
Yura et al. ESPACENET English machine translation JP 2014067546 Apr. 17, 2014.*
Tokoro ESPACENET English machine translation JP 2016110982 Jun. 20, 2016.*
Liang et al. Espacenet Abstract CN 1493522 May 5, 2004.*
Liang et al. ESPACENET English machine translation CN 1493522 Apr. 17, 2014 May 5, 2004.*
Heilbronner et al. Image Analysis in Earth Sciences: Microstructures and Textures of Earth 2014 Liverpool UK p. 326 (publication considered Dec. 2014).*
JP 2000323123 Osanai et al. English Machine Translation ESPACENET Nov. 24, 2000.*
Osanai et al. Abstract ESPACENET Nov. 24, 2000.*
USPTO Translator Statement U.S. Appl. No. 16/644,114, filed Jan. 27, 2022.*
R. Heilbronner et al. Image Analysis in Earth Sciences: Microstructures and Textures of Earth Materials (C) 2014 Liverpool UK p. 326 (publication considered Dec. 2014).*
Notice of Opposition mailed by the Japanese Patent Office on May 25, 2020 for Japanese Patent No. 6587044.
International Search Report and English Translation, PCT/JP2018/047888, dated Feb. 5, 2019, 4 pgs.
Written Opinion, PCT/JP2018/047888, dated Jan. 25, 2019, 4pgs.
Extended European Search Report dated Aug. 27, 2021 for European Patent Application No. 18895165.1.
Chinese Office Action dated Sep. 3, 2021 for Chinese Patent Application No. 201880055050.6.

* cited by examiner

CATHODE ACTIVE MATERIAL FOR LITHIUM ION SECONDARY BATTERY, METHOD FOR MANUFACTURING CATHODE ACTIVE MATERIAL FOR LITHIUM ION SECONDARY BATTERY, AND LITHIUM ION SECONDARY

TECHNICAL FIELD

The present invention relates to a cathode active material for a lithium ion secondary battery, a method for manufacturing the cathode active material for a lithium ion secondary battery, and a lithium ion secondary battery.

BACKGROUND ART

Lithium ion secondary batteries have been widely used as a small-sized and lightweight secondary battery having a high energy density. The lithium ion secondary battery is featured by its high energy density and small memory effect, as compared with other secondary batteries such as nickel hydride storage battery and nickel cadmium storage battery. Hence its applications are expanding from small-sized power sources for mobile electronic devices and home electric appliances; up to middle- to large-sized power sources including stationary power sources such as power storage device, uninterruptible power supply, and power leveling device, as well as driving power sources for vessels, railway vehicles, hybrid railway vehicles, hybrid cars, and electric cars.

Lithium-ion secondary batteries have been required to have a higher capacity due to their expanding applications and the like. The charge-discharge capacity of a lithium ion secondary battery largely depends on the filling rate of the cathode active material in the cathode. For this reason, in the preparation of a cathode, the powder of the cathode active material is subjected to particle size adjustment and then pressure molding. In general, a cathode is provided so that secondary particles formed by an aggregation of primary particles will leave pores for permeation of the electrolyte solution to form a porous body having a high filling rate. It is considered that the performance of a cathode is affected by the diffusion distance in the solid phase in such a state, the interfacial resistance between particles, and the like.

As one type of the cathode active material for a lithium ion secondary battery, there are lithium composite compounds having an α-NaFeO$_2$ type crystal structure. LiNiO$_2$-based oxides having a high nickel content, included in this type of lithium composite compounds, exhibit a high charge-discharge capacity and are therefore expected to be applied to various uses. However, it is known that a lithium composite compound having a high nickel content has low structural stability and is easily degraded with a charge-discharge cycle or high-temperature storage. In addition, it is known that the lithium composite compound undergoes a large volume change attributed to charge and discharge.

The particles of the lithium composite compound may experience breakage such as cracks, or deformation, due to a pressure applied during pressure molding or a volume change attributed to charge and discharge. In particular, since the secondary particles of the lithium composite compound have an aggregated structure subject to breakage by such stress, there are problems of the generation of isolated particles not contributing to the conduction of ions and electrons, and the increase in interfacial resistance. Under such circumstances, studies have been conducted on a technique for enhancing the particle strength of a LiNiO$_2$-based lithium composite compound that undergoes a large volume change.

For example, Patent Literature 1 describes a cathode active material for a lithium ion battery, the cathode active material being represented by the composition formula Li$_x$Ni$_{1-(y+z)}$Mn$_y$Co$_z$O$_{2+\alpha}$ (in the formula, 0.9≤x≤1.2, 0<y+z≤0.3, −0.1≤α≤0.1), the average particle size D50 being 5 to 7 μm, the particle strength being 60 MPa or higher, and the average porosity in the interior of particles having a particle size of 3 μm or more being 5% or less. Patent Literature 1 states that controlling the rate of temperature rise during firing at 200° C./h or more reduces pores in the cathode active material, improving the particle strength (see paragraph 0029). In addition, it is stated that, when a pulverizer is used for pulverization with both the classification rotor and the pulverizing rotor at a rotation speed of 5000 rpm or more, the included pores disappear and the particle strength further increases (see paragraph 0030).

Conventionally, the effects of impurities mixed in the cathode active material have also been studied. Patent Literature 2 states that the charge-discharge cycle characteristic of a lithium ion secondary battery is affected by lithium carbonate and lithium hydroxide present as impurities on the particle surface of the cathode active material. It is known that a lithium composite compound can be in a state where impurities such as lithium carbonate have formed a heterogeneous phase or adhered due to a starting material used for synthesis, exposure to the air, and the like.

CITATION LIST

Patent Literature

Patent Literature 1: Japanese Patent Application Publication No. 2016-149258
Patent Literature 2: Japanese Patent Application Publication No. 2016-076470

SUMMARY OF INVENTION

Technical Problem

The technique described in Patent Literature 1 makes it possible to produce the powder of the cathode active material having a particle strength of about 60 MPa or more (see Embodiment Examples). However, in Patent Literature 1, the average particle size D50 of the cathode active material is controlled at 5 μm or more, and the ratio of the number of primary particles in the secondary particles is also controlled at high. Thus, in the produced powder of the cathode active material, the particles constituting the cathode active material are close to single particles, and the number of primary particles contained in the secondary particles is about 1.2 to 1.7. In addition, the powder of the cathode active material has a relatively large individual particle size and a small specific surface area of about 0.6 m$^2$/g or less.

In the preparation of a cathode, use of the powder of the cathode active material close to single particles and having a large particle size as in Patent Literature 1 results in a long diffusion distance of ions in the particles, and also a high volume ratio of the region located deep and having a long diffusion distance. For those reasons, there is a problem that the output characteristic of the lithium ion secondary battery deteriorates. In addition, when the particles are large in particle size and close to single particles, the specific surface area of the cathode active material cannot be made large, and the porosity in the cathode tends to increase. Therefore, even when the particle strength is enhanced, there is a possibility that the lithium ion secondary battery may encounter a decrease in charge-discharge capacity or difficulty in increasing the output.

In addition, in the technique described in Patent Literature 1, the cathode active material is synthesized by a liquid phase method using lithium carbonate as a starting material, and the precipitated lithium-containing carbonate is filtered, dried, and then fired (see paragraph 0028 and the like). In the method including filtering and drying in this way, the steps become complicated resulting in difficulty in mass production of the cathode active material, and dedicated equipment is required for filtration and reuse of the filtered lithium. In addition, the precursor produced after filtration and drying has an irregular particle shape, and the uniformity of the particle shape tends to be low. This degrades the coatability when forming the cathode electrode mixture layer, which may cause a problem in handling, or may easily cause breakage or deformation during firing.

Under such circumstances, there is a need for a technique which is applicable to a lithium composite compound having a high nickel content without being affected by the design of the specific surface area, and which can improve particle strength without making the particles constituting the cathode active material close to single particles as in Patent Literature 1. The present inventors have confirmed that, when lithium carbonate is used as a starting material of the lithium composite compound, impurities such as lithium carbonate may be mixed as in Patent Literature 2, and the breaking strength (particle breaking strength) of secondary particles tends to decrease. When the secondary particles having a low particle breaking strength are used to form the cathode mixture layer, there is also a problem that the cathode active material is lowered in adhesion between particles or with current collectors.

In view of the above, an object of the present invention is to provide a cathode active material for a lithium ion secondary battery in which the secondary particles constituting the powder have a high breaking strength and a good coatability, a method for manufacturing a cathode active material for a lithium ion secondary battery, and a lithium ion secondary battery.

Solution to Problem

In order to achieve the above object, a cathode active material for a lithium ion secondary battery according to the present invention includes a primary particle of a lithium composite compound represented by the following formula (1); and secondary particles formed by an aggregation of primary particles of the lithium composite compound, wherein a ratio ($D_1/D_2$) between an average particle size ($D_1$) of the primary particles and an average particle size ($D_2$) of the secondary particles is 0.006 or more and 0.25 or less, an amount of lithium carbonate is 0.4% by mass or less, and a breaking strength of the secondary particles is 30 MPa or more $$Li_{1+a}Ni_xCo_yM1_{1-x-y-z}M2_zO_{2+\alpha} \quad (1)$$

provided that (a) in the formula (1), M1 is at least one element selected from a group consisting of Mn and Al, (b) M2 is at least one element selected from a group consisting of Mg, Ti, Zr, Mo, and Nb, and (c) a, x, y, z, and a are numbers satisfying $-0.1 \le a \le 0.2$, $0.7 \le x < 1.0$, $0 \le y < 0.3$, $0 \le z \le 0.25$, $0 < 1-x-y-z < 0.3$, and $-0.2 \le \alpha \le 0.2$ respectively.

In addition, a method for manufacturing a cathode active material for a lithium ion secondary battery according to the present invention includes a mixing step of producing a mixture by mixing lithium carbonate with compounds each containing a metal element shown in the formula (1) other than Li; and a firing step of producing a lithium composite compound represented by the formula (1) by firing the mixture, wherein the firing step includes a first firing step of producing a first precursor by firing the mixture at a firing temperature of 200° C. or higher and 400° C. or lower for 0.5 hours or longer and 5 hours or shorter, a second firing step of producing a second precursor by firing the first precursor at a firing temperature of 450° C. or higher and 800° C. or lower for 0.5 hours or longer and 50 hours or shorter, a third firing step of producing the lithium composite compound by firing the second precursor at a firing temperature of 755° C. or higher and 900° C. or lower for 0.5 hours or longer and 50 hours or shorter in an oxidative atmosphere, and a sealing step of sealing, after the firing step, in a storage container the lithium composite compound having an amount of lithium carbonate of 0.4% by mass or less and a moisture content of 500 ppm or less. In addition, a lithium ion secondary battery includes a cathode comprising the cathode active material for a lithium ion secondary battery.

Advantageous Effects of Invention

The present invention makes it possible to provide a cathode active material for a lithium ion secondary battery in which the secondary particles constituting the powder have a high breaking strength and a good coatability, a method for manufacturing a cathode active material for a lithium ion secondary battery, and a lithium ion secondary battery.

DESCRIPTION OF EMBODIMENTS

Figure 1:
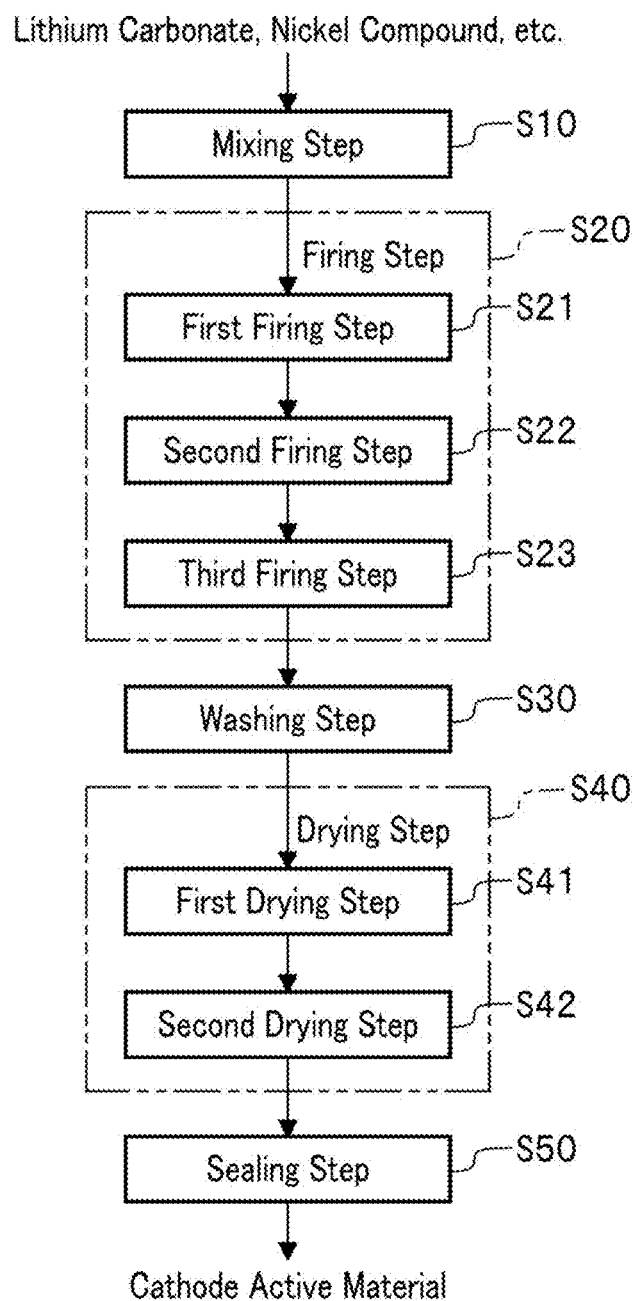
FIG. 1 is a flowchart illustrating an example of a method for manufacturing a cathode active material for a lithium ion secondary battery according to an embodiment of the present invention.

Hereinafter, detailed description is provided for a cathode active material for a lithium ion secondary battery according to an embodiment of the present invention, and a method for manufacturing the same. Note that the same reference numerals are given to common configurations in the following figures, and redundant description is omitted.

[Cathode Active Material]

The cathode active material according to the present embodiment has an α-NaFeO₂ type layered structure as a crystal structure, and is composed of a lithium composite oxide (lithium composite compound) containing lithium and a transition metal. The main phase of the cathode active material is a lithium composite compound having a layered structure. Note that, as described later, the cathode active material may contain lithium carbonate as an unavoidable impurity depending on the manufacturing conditions. Lithium carbonate can exist in a state where a heterogeneous phase is formed or in a state attached to the particles of the cathode active material.

A cathode active material according to the present embodiment is a powder composed of particles of a lithium composite compound, and includes a primary particle of a lithium composite compound represented by the following formula (1) and a secondary particle formed by an aggregation of primary particles of the lithium composite compound represented by the following formula (1).

$$\text{Li}_{1+a}\text{Ni}_x\text{Co}_y\text{M1}_{1-x-y-z}\text{M2}_z\text{O}_{2+\alpha} \qquad (1)$$

provided that (a) in the formula (1), M1 is at least one element selected from a group consisting of Mn and Al, (b) M2 is at least one element selected from the group consisting of Mg, Ti, Zr, Mo, and Nb, and (c) a, x, y, z, and a are numbers satisfying $-0.1 \leq a \leq 0.2$, $0.7 \leq x < 1.0$, $0 \leq y < 0.3$, $0 \leq z \leq 0.25$, $0 < 1-x-y-z < 0.3$, and $-0.2 \leq \alpha \leq 0.2$ respectively.

The cathode active material represented by the formula (1) has a high nickel content, and thus can exhibit a higher charge-discharge capacity than $\text{LiCoO}_2$ or the like in a range up to about 4.3 V. In addition, since the cathode active material has a high nickel content, the starting material cost is lower than that of $\text{LiCoO}_2$ or the like, and the starting material is easily available.

Now, significance of the numerical ranges of a, x, y, z, and a shown in the formula (1) will be explained.

In the above formula, "a" is defined to be −0.1 or more and 0.2 or less. The coefficient "a" represents the excess or deficiency of lithium based on the stoichiometric ratio of the lithium composite compound represented by the general formula: $\text{LiM1O}_2$, that is, Li:M1:O=1:1:2. When the amount of lithium is excessively small, the charge-discharge capacity of the cathode active material decreases. On the other hand, when the amount of lithium is excessively large, the charge-discharge cycle characteristic deteriorates. With the coefficient "a" controlled within the above numerical range, it is possible to achieve both a high charge-discharge capacity and a good charge-discharge cycle characteristic.

The coefficient "a" may be −0.02 or more and 0.05 or less. When the coefficient "a" is −0.02 or more, a sufficient amount of lithium to contribute to charge and discharge is secured, making it possible to increase the charge-discharge capacity of the cathode active material. In addition, when the coefficient "a" is 0.05 or less, the charge compensation by the change in the valence of the transition metal is sufficiently performed, making it possible to achieve both a high charge-discharge capacity and a good charge-discharge cycle characteristic.

The coefficient "x" for nickel is 0.7 or more and less than 1.0. When the coefficient "x" is 0.7 or more, a sufficiently high charge-discharge capacity can be obtained as compared with the case of using another transition metal. Therefore, with the coefficient "x" controlled within the above numerical range, it is possible to manufacture a cathode active material exhibiting a high charge-discharge capacity at a lower cost than that for $\text{LiCoO}_2$ or the like.

The coefficient "x" is defined to be preferably 0.8 or more and 0.95 or less, and more preferably 0.85 or more and 0.95 or less. When the coefficient "x" is 0.8 or more, the larger the coefficient "x" is, the higher the obtained charge-discharge capacity is. In addition, when the coefficient "x" is 0.95 or less, as the coefficient "x" is smaller, lattice distortion or crystal structure change due to insertion or desorption of lithium ions is smaller, reducing the risk of decrease in crystallinity and cation mixing in which nickel is mixed into lithium sites during firing. This thus suppresses the deterioration of charge-discharge capacity or charge-discharge cycle characteristic.

A coefficient "y" for cobalt is defined to be 0 or more and less than 0.3. When cobalt is added, the crystal structure is stabilized, so that effects can be obtained such as suppression of cation mixing in which nickel is mixed into lithium sites. Therefore, the charge-discharge cycle characteristic can be improved without significantly impairing the charge-discharge capacity. On the other hand, when cobalt is excessive, the starting material cost increases, so that the manufacturing cost of the cathode active material increases. Therefore, with the coefficient "y" controlled within the above numerical range, it is possible to achieve both a high charge-discharge capacity and a good charge-discharge cycle characteristic together with good productivity.

The coefficient "y" may be 0.01 or more and 0.2 or less, or 0.03 or more and 0.2 or less. When the coefficient "y" is 0.01 or more, as the coefficient "y" is larger, the effect by the elemental substitution of cobalt is sufficiently obtained, and the charge-discharge cycle characteristic is further improved. In addition, when the coefficient "y" is 0.2 or less, the starting material cost becomes lower, and the productivity of the cathode active material becomes better.

A coefficient "1−x−y−z" for M1 is greater than 0 and less than 0.3. When at least one element (M1) selected from the group consisting of manganese and aluminum is elementally substituted, the layered structure can be more stably maintained even when lithium is desorbed by charging. On the other hand, when these elements (M1) are excessive, the ratio of other transition metals such as nickel decreases, and the charge-discharge capacity of the cathode active material decreases. With the coefficient "1−x−y−z" controlled within the above numerical range, the crystal structure of the cathode active material can be kept stable, making it possible to obtain, for example, a high charge-discharge capacity as well as a good charge-discharge cycle characteristic and thermal stability.

The element represented by M1 is preferably manganese, aluminum, and the like. Such an element contributes to stabilization of the crystal structure of a cathode material having a high nickel content. Manganese is particularly preferable. When manganese is elementally substituted, it is possible to obtain a higher charge-discharge capacity than in the case where aluminum is elementally substituted. In addition, during the firing of the lithium composite compound, manganese also reacts with lithium carbonate as indicated in the following formula (2). Such a reaction suppresses the coarsening of crystal grains, allowing oxidation reaction of nickel to proceed at high temperature. Therefore, it is possible to efficiently produce a cathode active material exhibiting a high charge-discharge capacity.

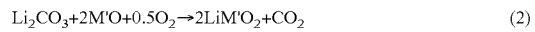
$$\text{Li}_2\text{CO}_3 + 2\text{M'O} + 0.5\text{O}_2 \rightarrow 2\text{LiM'O}_2 + \text{CO}_2 \qquad (2)$$

provided that in the formula (2), M' represents a metal element such as Ni, Co, or Mn.

The coefficient "1−x−y−z" for M1 is preferably 0.02 or more, and more preferably 0.04 or more. As the coefficient "1−x−y−z" for M1 is larger, the effect by the elemental substitution of manganese is more sufficiently obtained. Specifically, the oxidation reaction of nickel can be allowed to proceed at a higher temperature, and a cathode active material having a high charge-discharge capacity can be obtained more efficiently. In addition, the coefficient "1−x−y−z" for M1 is preferably 0.18 or less. When the coefficient "1−x−y−z" for M1 is 0.18 or less, the charge-discharge capacity is kept high even in the case of elemental substitution.

The coefficient "z" for M2 is defined to be 0 or more and 0.25 or less. When at least one element (M2) selected from the group consisting of magnesium, titanium, zirconium, molybdenum, and niobium is elementally substituted, various performance such as charge-discharge cycle characteristic can be improved while maintaining the activity of the cathode active material. On the other hand, when these elements (M2) are excessive, the ratio of other transition metals such as nickel decreases, and the charge-discharge capacity of the cathode active material decreases. With the coefficient "z" controlled within the above numerical range, it is possible to achieve, for example, a high charge-discharge capacity as well as a good charge-discharge cycle characteristic.

In the above formula (1), a is defined to be −0.2 or more and 0.2 or less. The coefficient "α" represents the excess or deficiency of oxygen based on the stoichiometric ratio of the lithium composite compound represented by the general formula: $LiM'O_2$, that is, Li:M':O=1:1:2. With the coefficient "α" controlled within the above numerical range, the crystal structure will have less defect, so that it is possible to obtain a high charge-discharge capacity and a good charge-discharge cycle characteristic.

In the cathode active material according to the present embodiment, the ratio ($D_1/D_2$) between the average particle size ($D_1$) of the primary particles of the lithium composite compound and the average particle size ($D_2$) of the secondary particles formed by an aggregation of the primary particles of the lithium composite compound is 0.006 or more and 0.25 or less. When the ratio ($D_1/D_2$) is less than 0.006, the primary particles constituting the cathode active material are smaller than the secondary particles, meaning that the primary particles are not grown. For this reason, the bonding between the primary particles is insufficient, decreasing the strength of the secondary particles. In addition, since the specific surface area is large, reaction easily takes place with carbon dioxide and the like in the atmosphere, and impurities such as lithium carbonate are easily generated on the surface of the particles. When impurities such as lithium carbonate are generated on the surface of the primary particles, the breaking strength of the secondary particles tends to decrease. When the particle breaking strength becomes low, fine powder is likely to be generated at the time of coating with the cathode mixture, and the fine powder absorbs the binder. As a result, the distribution of the binder becomes non-uniform, causing a possibility that the cathode active material may be lowered in adhesion between particles or with current collectors. In addition, when the particle breaking strength becomes low, there is a possibility that breakage or deformation may easily occur at the time of pressure molding or at the time of volume change attributed to charge and discharge. On the other hand, when the ratio ($D_1/D_2$) exceeds 0.25, the primary particles constituting the cathode active material are larger than the secondary particles, and the number of particles constituting the secondary particles is too small. Therefore, the diffusion distance of the ions in the particles becomes long, causing a possibility that the output characteristic of the lithium ion secondary battery may deteriorate.

On the other hand, when the ratio ($D_1/D_2$) of the particle sizes is 0.006 or more and 0.25 or less, the primary particles constituting the cathode active material are grown to have an appropriate size, and the number of particles constituting the secondary particles is also appropriate. As a result, a cathode active material is formed which has a high strength of the primary particles themselves, an appropriate size of specific surface area, and easily diffusing ions. Therefore, when such a cathode active material is used, the coating condition of the cathode active material is improved, and the stability against external force and volume change is also increased, making it possible to produce a lithium ion secondary battery exhibiting a high charge-discharge capacity and a good output characteristic. In addition, the breaking strength of the secondary particles constituting such a cathode active material can be made higher than that of a cathode active material having normal purity by reducing the amount of lithium carbonate.

The average particle size ($D_1$) of the primary particles of the lithium composite compound is preferably 0.1 μm or more and 2.0 μm or less, and more preferably 0.2 μm or more and 1.0 μm or less. When the average particle size is in this range, the diffusion distance of ions in the particles does not become excessive, while the specific surface area of the cathode active material and the filling rate of the cathode active material in the cathode tend to increase. Therefore, a high charge-discharge capacity and a good output characteristic can be obtained.

The particle size of the primary particles of the lithium composite compound can be measured based on observation with a scanning electron microscope (SEM) or a transmission electron microscope (TEM). The average particle size is obtained by extracting ten particles in the order of particle sizes close to the median and calculating the weighted average of these particle sizes. Note that the particle size can be determined as the average value of the major axis diameters and the minor axis diameters of the particles in the observed electron microscope image. In addition, the particle size of the secondary particles of the lithium composite compound can be determined as a 50% particle size in a volume-based integrated particle size distribution by a laser diffraction/scattering type particle size distribution analyzer.

The secondary particles of the lithium composite compound preferably have an aspect ratio of from 0.6 to 1.0 both inclusive. When the aspect ratio is in this range, the breaking strength of the secondary particles tends to be uniformly high, and breakage or deformation does not easily occur at the time of pressure molding or at the time of volume change attributed to charge and discharge. In addition, the filling property of the particles of the lithium composite compound is improved, increasing the molding density of the cathode and the filling rate of the cathode active material in the cathode. This makes it possible to obtain a higher charge-discharge capacity and a better charge-discharge cycle characteristic. The aspect ratio of the secondary particles of the lithium composite compound can be determined by observing any secondary particles with an electron microscope to extract 10 particles in the order of particle sizes close to the median, measuring the major axis diameters and the minor axis diameters of these particles, dividing the major axis diameters by the minor axis diameters, and averaging the obtained values using the number of samples, 10.

The BET specific surface area of the cathode active material is 0.1 $m^2/g$ or more, and preferably 0.2 $m^2/g$ or more. In addition, the BET specific surface area is 1.2 $m^2/g$ or less, and preferably 1.0 $m^2/g$ or less. When the BET specific surface area is within this range, the molding density of the cathode and the filling rate of the cathode active material in the cathode are sufficiently increased. In addition, since the BET specific surface area is not excessively large, reaction with carbon dioxide or the like in the atmosphere is suppressed, reducing the amount of impurities such as lithium carbonate mixed into the cathode active material. Thus, the breaking strength of the secondary particles is unlikely to decrease. As a result, fine powder is less likely to be generated at the time of coating with the cathode mixture, and the uniformly distributed secondary particles and binder maintain high adhesion between cathode active material particles or with current collectors. In addition, breakage or deformation does not easily occur at the time of pressure molding or at the time of volume change attributed to charge and discharge. Additionally, the binder is not excessively absorbed into the pores of the cathode active material itself, reducing the risk of impairing the original function of the binder. Therefore, the coating condition of the cathode active material is improved, and the stability against external force and volume change is also increased, making it possible to produce a lithium ion secondary battery exhibiting a high charge-discharge capacity and a good output characteristic.

In the cathode active material according to the present embodiment, the open pore volume ratio of secondary particles is 20% or less, it is possible to increase the filling rate of the cathode active material in the cathode. In addition, since it is possible to reduce the reaction with carbon dioxide and the like in the atmosphere, the amount of lithium carbonate and the like can be reduced to suppress the risk of breakage or deformation at the time of pressure molding or at the time of volume change attributed to charge and discharge. The open pore volume ratio of the secondary particles is preferably 12% or less, and more preferably 10% or less. Within such a range, the particle strength of the secondary particles can be secured, making it possible to improve the coatability while maintaining a high discharge capacity. In addition, the open pore volume ratio may be 0%. This is because, even when there is substantially no pores inside the particles, the battery reaction on the surface of the secondary particles can be effectively secured by setting the specific surface area to 0.1 $m^2/g$ or more. Moreover, since the secondary particles are tight, it is possible to improve the particle strength, to not only improve the coatability but also prevent particle collapse during electrode pressing, and to achieve a high electrode density. Note that the open pore volume ratio means the ratio of the total volume of open pores having a pore diameter of from 0.1 μm to 0.5 μm both inclusive relative to the apparent volume of the secondary particles. The open pore volume ratio can be calculated from the product of the open pore volume (per unit weight) measured using the mercury intrusion method and the apparent density of the secondary particles.

In the cathode active material according to the present embodiment, the amount of lithium carbonate is 0.4% by mass or less, which is an elution amount eluted when immersed in pure water. When lithium carbonate is used as a starting material for the cathode active material, lithium in the lithium composite compound may react again with carbon dioxide desorbed during firing. In addition, when an alkali compound is present in the starting material or an alkali compound is generated by a reaction between lithium and moisture, lithium in the lithium composite compound may react with carbon dioxide in the air. When lithium is extracted from the layered structure by such a reaction to generate lithium carbonate, the activity of the cathode active material may be reduced, or the particle breaking strength may be reduced. However, if the amount of lithium carbonate eluted is reduced to 0.4% by mass or less, the activity of the cathode active material is good, and the breaking strength of the secondary particles constituting the cathode active material is higher than that of a cathode active material having normal purity. The amount of lithium carbonate eluted is preferably reduced to 0.3% by mass or less, more preferably 0.2% by mass or less, and further preferably 0.1% by mass or less.

In the cathode active material according to the present embodiment, the amount of lithium hydroxide contained as an impurity is preferably 0.7% by mass or less as an elution amount eluted when immersed in pure water. Lithium in the lithium composite compound may generate lithium hydroxide by reacting with moisture contained in the starting material or moisture in the air. Lithium hydroxide lowers the activity of the cathode active material or generates hydrofluoric acid in the electrolyte solution of the lithium ion secondary battery to deteriorate the charge-discharge cycle characteristic. Lithium hydroxide may also change the quality of a binder such as PVDF to lower the coatability and adhesion of the cathode active material. However, if the amount of lithium hydroxide eluted is sufficiently reduced, it is possible to produce a cathode active material having good activity, reducing the risk of deteriorating the performance of the lithium ion secondary battery.

The amount of lithium carbonate eluted and the amount of lithium hydroxide eluted can be determined by a method for neutralizing and titrating a solution immersed with the cathode active material. Specifically, the cathode active material is immersed in pure water to a solid content ratio to 0.016% by mass, immersed and stirred for 60 minutes, then quantitatively determined by neutralization titration of a solution produced by filtration, and converted into an impurity weight per weight of the cathode active material. The amount of lithium carbonate eluted and the amount of lithium hydroxide eluted can be reduced by adjustment of the firing temperature, the firing time, the atmosphere, and the like when firing the lithium composite compound, and by treatment of washing the fired lithium composite compound with water. In addition, the amount of lithium carbonate eluted and the amount of lithium hydroxide eluted increase due to exposure to the air and the like, but can be suppressed in the steps after firing by treating the fired lithium composite compound in an atmosphere having a low carbon dioxide concentration or a low moisture concentration.

In the cathode active material according to the present embodiment, the moisture content from immediately after firing to the time of preparing the lithium ion battery is preferably 500 ppm or less, more preferably 300 ppm or less, and further preferably 250 ppm or less. When the moisture content is 500 ppm or less, the slurry of the cathode mixture is less likely to be gelated at the time of preparing the cathode, making it possible to prevent deterioration of the coatability of the cathode mixture. In addition, the reaction between lithium and moisture in the lithium composite compound, and the reaction between the electrolyte solution and the moisture are less likely to occur, so that the performance of the lithium ion secondary battery does not easily deteriorate. The moisture content of the lithium composite compound can be lowered by adjustment of the firing temperature, the firing time, the atmosphere, and the like when firing the lithium composite compound, by appropriate management of the storage atmosphere after firing, and by treatment of drying the lithium composite compound. The moisture content of the lithium composite compound can be measured by the Karl Fischer method.

In the cathode active material according to the present embodiment, the breaking strength (particle breaking strength) of the secondary particles of the lithium composite compound is 30 MPa or more, preferably 40 MPa or more, more preferably 60 MPa or more, and further preferably 80 MPa or more, and 200 MPa or less. Such a particle breaking strength reduces the risk of breakage or deformation at the time of pressure molding or at the time of volume change attributed to charge and discharge. Therefore, a high charge-discharge capacity and a good output characteristic can be obtained. In addition, since the particles are less likely to be broken, when the cathode current collector is coated with a cathode mixture containing a lithium composite compound to form a cathode mixture layer, adhesion between cathode active material particles or with current collectors is easily maintained, and coating defects such as flaking are less likely to occur. The breaking strength of the secondary particles can be made higher than that of a cathode active material having normal purity by reducing the amount of lithium carbonate. That is, regardless of whether or not the particles constituting the secondary particles are close to single particles, it is possible to obtain an effect of improving resistance to external force. The particle breaking strength can be measured, for example, using a micro compression tester capable of measurement at individual particle level.

The crystal structure of the cathode active material can be confirmed by, for example, X-ray diffraction (XRD) or the like. In addition, the composition of the cathode active material can be confirmed by high-frequency inductively coupled plasma (ICP) emission spectroscopy, atomic absorption spectroscopy (AAS), or the like.

[Method for Manufacturing Cathode Active Material]

Next, description is provided for a method for manufacturing the above-described cathode active material for a lithium ion secondary battery. The cathode active material can be manufactured according to a general method for manufacturing a cathode active material such as the solid phase process, the coprecipitation method, the sol-gel method, and the hydrothermal method. Hereinafter, description is provided for a method for synthesizing the above-described cathode active material by the solid phase process using lithium carbonate as a starting material.

The above-described cathode active material, in which the amount of lithium carbonate has been reduced and the breaking strength of the secondary particles constituting the cathode active material has been enhanced, is produced by reducing contact with carbon dioxide in the atmosphere in the subsequent steps of sufficiently reducing the amount of lithium carbonate that remains in the lithium composite compound at the end of firing by adjustment of the firing temperature, the firing time, the atmosphere, and the like in the firing, and treating the lithium composite compound having undergone appropriate particle growth. At this time, when the fired lithium composite compound is washed with water, it is possible to reduce the amount of lithium carbonate eluted together with the amount of lithium hydroxide eluted.

In view of the above, the present embodiment exemplifies a manufacturing method in which a lithium composite compound synthesized by the solid phase process is fired, and then washed with water and dried to produce a cathode active material stored in a storage container. In the steps from the end of firing to the sealing in a storage container, this manufacturing method treats the fired lithium composite compound in an atmosphere having a low carbon dioxide concentration to prevent the increase of lithium carbonate due to contact with carbon dioxide in the atmosphere.

FIG. 1 is a flowchart illustrating an example of a method for manufacturing a cathode active material for a lithium ion secondary battery according to an embodiment of the present invention.

As illustrated in FIG. 1, the method for manufacturing a cathode active material for a lithium ion secondary battery according to the present embodiment includes a mixing step S10, a firing step S20, a washing step S30, a drying step S40, and a sealing step S50. Through these steps, the lithium composite compound represented by the formula (1) is synthesized, and a quality-maintained cathode active material is produced sealed in a storage container. Note that steps other than these steps may be added or may be subtracted. For example, the washing step S30 and the drying step S40 may be omitted when the residual amount at the end of firing is small.

The mixing step S10 mixes lithium carbonate and a compound containing a metal element shown in the formula (1) other than Li. That is, as a starting material of the cathode active material, lithium carbonate and a nickel compound containing nickel are mixed. In addition, when the lithium composite compound represented by the formula (1) contains cobalt, an element represented by M1, and an element represented by M2, a compound containing these elements is added and mixed.

In the mixing step S10, at least lithium carbonate is used as a starting material containing lithium. Lithium carbonate is less expensive than lithium acetate, lithium nitrate, lithium hydroxide, lithium chloride, lithium sulfate, and the like, and is easily available. In addition, since lithium carbonate is weakly alkaline, there is an advantage that damage to a manufacturing apparatus is reduced. In addition, since lithium carbonate has a relatively high melting point, it is possible to avoid the formation of a liquid phase and the production of coarse crystal grains during synthesis by the solid phase process.

In the mixing step S10, a nickel compound such as nickel hydroxide, nickel carbonate, nickel oxide, nickel sulfate, or nickel acetate can be used as a starting material containing nickel. Among these, the nickel compound used is particularly preferably nickel hydroxide, nickel carbonate, or nickel oxide.

In the mixing step S10, as the cobalt compound containing cobalt, the metal compound containing an element represented by M1, and the metal compound containing an element represented by M2, nitrates, carbonates, sulfates, acetates, oxides, hydroxides, and the like can be used. Among these, it is particularly preferable to use a carbonate, an oxide, or a hydroxide.

In the mixing step S10, starting materials such as lithium carbonate are individually weighed, ground, and mixed to produce a powdery mixture. A grinder used for grinding the starting materials can be any of ordinary fine grinders such as a ball mill, a jet mill, and a sand mill. The starting materials may be either dry-ground or wet-ground. The starting material slurry produced by wet grinding can be dried using various types of driers such as a spray dryer, a fluidized bed dryer, and an evaporator.

In the mixing step S10, the starting material such as lithium carbonate is preferably ground until the average particle size becomes 0.5 μm or less, and more preferably ground until the average particle size becomes 0.2 μm or less. When the starting material is ground to such a small particle size, the reactivity between lithium carbonate and a nickel compound is improved, and components such as carbon dioxide are easily desorbed from the starting material such as lithium carbonate. In addition, the degree of mixing of the ground product is increased, so that the firing can easily proceed uniformly, making it possible to easily control the average particle size of the primary particles of the lithium composite compound as the cathode active material to an appropriate range.

Preferably, the mixing step S10 prepares a slurry through mixing by wet grinding, and granulate the produced slurry by spray drying. When the starting material such as lithium carbonate is mixed by wet grinding in a medium such as water, and the produced slurry is granulated by spray drying, it is possible to stably produce, after firing, secondary particles whose average particle size is controlled and whose aspect ratio is approximated to 1. Various systems can be used as the spray dryer such as a two-fluid nozzle system, a four-fluid nozzle system, and a disk system.

The average particle size of the secondary particles granulated by spray drying is preferably 5 µm or more and 25 µm or less. When granulated to such a particle size, the average particle size of the secondary particles of the lithium composite compound produced after firing can be easily adjusted to a target range. The average particle size of the secondary particles to be granulated can be controlled by adjusting, for example, the concentration of the slurry, the viscosity of the slurry, the amount of the slurry sprayed, the degree of dispersion of the suspensoid, the spray temperature, the spray pressure, the blowing rate, and the like.

The firing step S20 fires a precursor (mixture) produced through the mixing step S10 to produce a lithium composite compound represented by the formula (1). In the firing step S20, the precursor produced through the mixing step S10, that is, the mixture subjected to an appropriate treatment such as spray granulation is fired under predetermined conditions to forma lithium composite compound having a layered structure. The average particle size of the primary particles of the lithium composite compound can be controlled mainly by the firing temperature and the firing time in the firing step S20. Note that the firing step S20 may be performed as a single-stage firing where the firing temperature is controlled within a certain range, or may be performed as a multi-stage firing where the firing temperature is controlled in different ranges.

As illustrated in FIG. 1, the firing step S20 preferably includes a first firing step S21, a second firing step S22, and a third firing step S23. When such a multi-step firing is performed, adjustment of the firing temperature, the firing time, the atmosphere, and the like makes it possible to greatly reduce the amount of lithium carbonate remaining in the lithium composite compound at the end of firing while growing the particle size of the lithium composite compound to an appropriate range. Therefore, the strength of the primary particles themselves and the breaking strength of the secondary particles can be increased.

In the first firing step S21, the mixture produced through the mixing step S10 is fired at a firing a temperature of 200° C. or higher and 400° C. or lower for 0.5 hours or longer and 5 hours or shorter, thereby a first precursor is produced. The first firing step S21 is performed mainly for the purpose of removing moisture and the like that hinder the synthesis reaction of the lithium composite compound from the mixture produced in the mixing step S10.

At the firing temperature being 200° C. or higher in the first firing step S21, combustion of impurities and the thermal decomposition of the starting material fully proceed, and this successfully suppresses an inert heterogeneous phase from being formed during subsequent firing. Meanwhile, at the firing temperature being 400° C. or lower, a crystal of the lithium composite compound is almost unlikely to be formed in this step, making it possible to avoid formation of a low-purity crystal phase that otherwise can be formed in the presence of a gas containing moisture or impurities.

The firing temperature in the first firing step S21 is preferably 250° C. or higher and 400° C. or lower, and more preferably 250° C. or higher and 380° C. or lower. At the firing temperature controlled within such a range, it now become possible to efficiently remove moisture or impurities, and also to certainly prevent a crystal of lithium composite compound from being formed in this step. The firing time in the first firing step S21 can be determined properly, depending for example on the firing temperature, amounts of moisture and impurities in the mixture, target levels of removal of moisture and impurities, and a degree of crystallinity.

The first firing step S21 is preferably conducted under a flow of an atmospheric gas, or under an evacuation by a pump. Firing in such an atmosphere can efficiently exclude a gas with moisture and impurities out. A flow rate of an air flow of the atmospheric gas, and an emission volume per unit time by the pump may be set to be higher than a volume of a gas generated from the mixture. The volume of the gas generated from the mixture can be determined, for example, on the basis of an amount of consumption of the starting materials, or, a mole ratio of a component which is to be gasified by combustion or thermal decomposition relative to the starting material.

The first step S21 may be conducted in an oxidative gas atmosphere, or in a non-oxidative gas atmosphere, or in a reduced-pressure atmosphere. The oxidative gas atmosphere may be either an oxygen gas atmosphere or an air atmosphere. The reduced-pressure atmosphere may have a pressure equal to or less than an atmospheric pressure and may be a reduced-pressure atmosphere condition having an appropriate degree of a vacuum.

In the second firing step S22, the first precursor produced through the first firing step S21 is fired at an firing temperature of 450° C. or higher and 800° C. or lower for 0.5 hours or longer and 50 hours or shorter, to produce a second precursor. The second firing step S22 is mainly aimed to remove a carbonate component produced from a reaction between lithium carbonate and nickel compound, and to oxide nickel from divalent to trivalent to form a crystal of the lithium composite compound.

In the second firing step S22, it is preferable to react 92% by mass or more, and it is more preferable to react 97% by mass or more of the lithium carbonate charged as the starting material. If the reaction of lithium carbonate is insufficient and the oxidation of nickel is inadequate, divalent nickel is likely to be replaced by lithium sites, and the charge-discharge capacity of the cathode active material may be reduced. In addition, if a large amount of lithium carbonate is left at the end of the second firing step S22, carbon dioxide may be released into the atmosphere of the third firing step S23 to inhibit the reaction of generating crystals, or carbonate components may be taken into the crystals of the lithium composite compound to reduce the particle breaking strength and the charge-discharge capacity. In contrast, when most of the lithium carbonate is reacted in the second firing step S22, it is possible to sinter a lithium composite compound exhibiting a high particle breaking strength and charge-discharge capacity in the third firing step S23.

In addition, if the reaction of lithium carbonate is insufficient and a large amount of lithium carbonate is left at the end of the second firing step S22, lithium carbonate may melt in the third firing step S23, to form a liquid phase. The lithium composite compound, if fired in such a liquid phase, may produce a coarse crystal grain, to thereby degrade the output properties of the lithium ion secondary battery. In contrast, if most of lithium carbonate is reacted in the second firing step S22, the liquid phase is less likely to be formed in the third firing step S23, so that the crystal grain of the lithium composite compound becomes less likely to be coarsened even at a high firing temperature. Therefore, it is possible to promote the oxidation of nickel at a high temperature while securing the output properties of the lithium ion secondary battery, and to sinter a lithium composite compound exhibiting a high particle breaking strength and charge-discharge capacity.

In the second firing step S22, at the firing temperature being 450° C. or higher, lithium carbonate, a nickel compound, and the like react to promote a layered structure formation, making it possible to prevent unreacted lithium carbonate from remaining. Hence, lithium carbonate will be less likely to form a liquid phase in the subsequent firing, the crystal grain is prevented from coarsening, and thereby a cathode active material having a high particle breaking strength and charge-discharge capacity is obtained. Meanwhile, at the firing temperature being 800° C. or lower, the grain does not excessively grow, so that the charge-discharge capacity of the cathode active material is improved.

The firing temperature in the second firing step S22 is preferably 550° C. or higher, more preferably 600° C. or higher, and further preferably 650° C. or higher. The higher the firing temperature is, the more the reaction of lithium carbonate is promoted, and the more reliably the residual lithium carbonate is prevented. In particular, when manganese is subjected to elemental substitution as the element represented by M1 shown in the formula (1), the firing temperature is preferably set to 600° C. or higher when the coefficient "1−x−y−z" for manganese is greater than 0 and less than 0.075. On the other hand, when the coefficient "1−x−y−z" for manganese is 0.075 or more, the reaction temperature is lowered, so the firing temperature may be set to 550° C. or higher.

The firing temperature in the second firing step S22 is preferably 700° C. or lower, and more preferably 680° C. or lower. The lower the firing temperature is in this way, the more the grain growth is suppressed, and thus the charge-discharge capacity of the cathode active material is improved. Also since lithium carbonate becomes less likely to melt, and the liquid phase becomes less likely to be formed, the crystal grain can be more certainly prevented from coarsening.

The firing time in the second firing step S22 is preferably 0.5 hours or longer and 50 hours or shorter, and more preferably 2 hours or longer and 15 hours or shorter. With the firing time controlled within such a range, lithium carbonate sufficiently reacts, and a carbonate component can be certainly removed. Also a necessary time for firing is shortened, so that productivity of the cathode active material is improved.

The second firing step S22 is preferably performed in an oxidative atmosphere. An oxygen concentration in an atmosphere is preferably 80% or more, more preferably 90% or more, further preferably 95% or more, and particularly preferably 100%. Meanwhile, a carbon dioxide concentration in the atmosphere is preferably 5% or less, more preferably 1% or less, and further preferably 0.1% or less. The second firing step S22 is preferably performed under a flow of an oxidative gas. Firing under such an oxidative gas flow makes it possible to certainly oxidize nickel, and to certainly remove carbon dioxide emitted into the atmosphere. The second firing step S22 may be performed multiple times as a calcination step.

In the third firing step S23, the second precursor produced in the second firing step S22 is fired at an firing temperature of 755° C. or higher and 900° C. or lower, for 0.5 hours or longer and 50 hours or shorter, to produce the lithium composite compound. The third firing step S23 is mainly aimed to sufficiently oxide nickel in the second precursor from divalent to trivalent, and to allow the crystal grain of the lithium composite compound having a layered structure to grow up to an appropriate size.

In the third firing step S23, at the firing temperature being 755° C. or higher, it becomes possible to sufficiently oxidize nickel, and to allow the primary particles to grow up to an appropriate particle size. This sinters a lithium composite compound having a high crystallinity and a low open pore volume ratio. As a result, the amount of lithium carbonate remaining during firing and the amount of lithium carbonate mixed after firing are reduced, making it possible to produce a cathode active material having a high particle breaking strength and charge-discharge capacity. Meanwhile, at the firing temperature being 900° C. or lower, lithium becomes less volatile, and the decomposition of the lithium composite compound having a layered structure is suppressed. Therefore, it is possible to avoid the lowering of the purity of the crystals produced after firing and the subsequent lowering of the charge-discharge capacity.

The firing temperature in the third firing step S23 is preferably 800° C. or higher, more preferably 840° C. or higher, and further preferably 850° C. or higher. At the firing temperature being such a high temperature, nickel is more certainly oxidized, and the grain growth of the lithium composite compound is promoted, so that the particle size of the primary particles can be made larger.

The firing temperature in the third firing step S23 is preferably 890° C. or lower. The lower the firing temperature is in this way, the less likely lithium vaporizes, making it possible to more certainly prevent the decomposition of the lithium composite compound having a layered structure, and to produce the lithium composite compound exhibiting a high charge-discharge capacity.

The firing time in the third firing step S23 is preferably 0.5 hours or longer and 15 hours or shorter. With the firing time in this range, the crystal grains of the lithium composite compound efficiently grow to an appropriate size, and nickel is sufficiently oxidized. As a result, it is possible to produce a lithium composite compound having a high crystal purity and a high particle breaking strength and charge-discharge capacity. Also a necessary time for firing is shortened, so that the productivity of the cathode active material is improved.

The third firing step S23 is preferably performed in an oxidative atmosphere. An oxygen concentration in an atmosphere is preferably 80% or more, more preferably 90% or more, further preferably 95% or more, and particularly preferably 100%. Meanwhile, a carbon dioxide concentration in the atmosphere is preferably 5% or less, more preferably 1% or less, and further preferably 0.1% or less. The third firing step S23 is preferably performed under a flow of an oxidative gas. Firing under such an oxidative gas flow makes it possible to certainly oxidize nickel, and to certainly remove carbon dioxide emitted into the atmosphere. The third firing step S23 is preferably performed once as the main firing step, but may be performed multiple times.

In the firing step S20, it is possible to use an appropriate heating apparatus as firing means, including a rotary furnace such as a rotary kiln; a continuous furnace such as a roller-hearth kiln, a tunnel kiln, and a pusher kiln; and a batch furnace. In each of the first firing step S21, the second firing step S22, and the third firing step S23, the same heating apparatus may be used, or different heating apparatuses may be used. In addition each firing step may be performed intermittently with replacing the atmosphere; or may be performed continuously while the atmospheric gas is continuously discharged.

Through the above mixing step S10 and firing step S20, it is possible to produce a lithium composite compound which contains the primary particles of the lithium composite compound represented by the formula (1) and the secondary particles formed by an aggregation of the primary particles of the lithium composite compound represented by the formula (1), and in which the ratio ($D_1/D_2$) between the average particle size ($D_1$) of the primary particles and the average particle size ($D_2$) of the secondary particles is 0.006 or more and 0.25 or less. The lithium composite compound may be classified as necessary so that the average particle size of the secondary particles is appropriate. The moisture content of the lithium composite compound after firing is preferably 500 ppm or less, more preferably 300 ppm or less, and further preferably 250 ppm or less. The moisture content of the lithium composite compound after firing can be measured by the Karl Fischer method.

A lithium composite compound having a controlled particle size ratio ($D_1/D_2$) and a relatively large specific surface area may contain impurities such as lithium carbonate and lithium hydroxide mixed due to reaction with carbon dioxide and moisture in the atmosphere, even after fired to a high crystal purity through normal first firing step S21, second firing step S22, and third firing step S23. Therefore, in the case of further reducing the amount of impurities, it is preferable to subject the compound to the washing step S30.

The washing step S30 washes with water the lithium composite compound produced in the firing step S20. The lithium composite compound can be washed with water by an appropriate method such as a method including immersing the lithium composite compound in water or a method including passing water through the lithium composite compound. By washing the lithium composite compound with water, it is possible to remove lithium carbonate, lithium hydroxide, and the like remaining on the surface and near the surface layer of the lithium composite compound. Water for immersion of the lithium composite compound may be still water or may be stirred. As the water, pure water such as deionized water or distilled water, ultrapure water, or the like can be used.

In the washing step S30, when the lithium composite compound is immersed in water, the solid content ratio of the lithium composite compound relative to the water for immersion is preferably set to 33% by mass or more and 77% by mass or less. When the solid content ratio is 33% by mass or more, the amount of lithium eluted from the lithium composite compound into water can be suppressed at low level. Therefore, it is possible to produce a cathode active material having a good charge-discharge capacity, output property, and the like. In addition, when the solid content ratio is 77% by mass or less, the powder can be uniformly washed with water, so that impurities can be surely removed.

The time for washing the lithium composite compound with water is preferably 20 minutes or less, and more preferably 10 minutes or less. When the washing time is 20 minutes or less, the amount of lithium eluted from the lithium composite compound into water can be suppressed at low level. Therefore, it is possible to produce a cathode active material having a good charge-discharge capacity, output property, and the like.

The lithium composite compound immersed in water can be recovered by an appropriate solid-liquid separation operation. Embodiment Examples of the solid-liquid separation method include reduced pressure filtration, pressure filtration, filter press, roller press, and centrifugal separation. The moisture content of the lithium composite compound separated from water by solid-liquid separation is preferably 20% by mass or less, and more preferably 10% by mass or less. When the moisture content is low as above, the lithium compound eluted in water does not reprecipitate in a large amount, so that the performance lowering of the cathode active material can be prevented. The moisture content of the lithium composite compound after solid-liquid separation can be measured, for example, using an infrared moisture meter.

The drying step S40 dries the lithium composite compound washed with water in the washing step S30. Drying of the lithium composite compound removes moisture which reacts with the components of the electrolytic solution to deteriorate the battery, and which changes the quality of the binder to cause coating defects. In addition, since the surface of the lithium composite compound is modified through the washing step S30 and the drying step S40, it is possible to obtain an effect of improving the compressibility of the cathode active material as a powder. As the drying method, for example, vacuum drying, heating drying, vacuum heating drying, and the like can be used.

The atmosphere in the drying step S40 is an inert gas atmosphere containing no carbon dioxide or a reduced-pressure atmosphere with a high vacuum degree. With such an atmosphere, a reaction with carbon dioxide and moisture in the atmosphere prevents lithium carbonate and lithium hydroxide from being mixed.

The drying temperature in the drying step S40 is preferably 300° C. or lower, and more preferably 80° C. or higher and 300° C. or lower. When the drying temperature is 300° C. or lower, drying can be performed while suppressing side reactions, making it possible to avoid the deterioration of the performance of the cathode active material. When the drying temperature is 80° C. or higher, moisture can be sufficiently removed in a short time. The moisture content of the lithium composite compound after drying is preferably 500 ppm or less, more preferably 300 ppm or less, and further preferably 250 ppm or less. The moisture content of the lithium composite compound after drying can be measured by the Karl Fischer method.

In the drying step S40, it is preferable to perform two or more stages of drying treatment with different drying conditions. Specifically, the drying step S40 preferably includes a first drying step S41 and a second drying step S42, as illustrated in FIG. 1. By performing such a multi-stage drying treatment, it is possible to prevent the change in quality of the powder surface of the lithium composite compound due to rapid drying. Therefore, it is possible to prevent the decrease in drying rate due to the change in quality of the powder surface.

In the first drying step S41, the lithium composite compound washed with water in the washing step S30 is dried at a drying temperature of 80° C. or higher and 100° C. or lower. In the first drying step S41, most of the moisture present on the particle surface of the lithium composite compound is removed mainly at a drying rate during the constant-rate drying period.

In the first drying step S41, when the drying temperature is 80° C. or higher, a large amount of moisture can be removed in a short time. In addition, when the drying temperature is 100° C. or lower, it is possible to suppress the change in quality of the powder surface of the lithium composite compound, which easily occurs at high temperature.

The drying time in the first drying step S41 is preferably 10 hours or longer and 20 hours or shorter. With the drying time controlled within this range, even at a relatively low drying temperature at which change in quality of the powder surface of the lithium composite compound is suppressed, most of the moisture present on the particle surface of the lithium composite compound can be removed.

The second drying step S42 dries the lithium composite compound, dried in the first drying step S41, at a drying temperature of 190° C. or higher and 300° C. or lower. In the second drying step S42, it is possible to reduce the moisture present near the particle surface layer of the lithium composite compound while suppressing side reactions which deteriorate the performance of the cathode active material. As a result, a lithium composite compound dried to an appropriate moisture content is produced.

In the second drying step S42, when the drying temperature is 190° C. or higher, it is possible to sufficiently remove moisture permeating near the particle surface layer of the lithium composite compound. In addition, when the drying temperature is 300° C. or lower, it is possible to dry the lithium composite compound by suppressing side reactions which deteriorate the performance of the cathode active material.

The drying time in the second drying step S42 is preferably 10 hours or longer and 20 hours or shorter. With the drying time controlled within this range, side reactions which deteriorate the performance of the cathode active material can be suppressed, and the lithium composite compound can be dried to a sufficiently low moisture content.

The sealing step S50 seals the lithium composite compound dried in the drying step S40 in a storage container. When exposed to the air, the lithium composite compound reacts with carbon dioxide and moisture in the air to deteriorate. For this reason, the lithium composite compound is subjected to post-treatments such as pulverization and classification as necessary, and then stored in a storage container until the manufacture of a lithium ion secondary battery. From the viewpoint of securing the breaking strength and coatability of the secondary particles, the lithium composite compound sealed in the storage container preferably has at least lithium carbonate in an amount of 0.4% by mass or less and a moisture content of 500 ppm or less.

As the storage container, it is possible to use a packaging container having an appropriate shape and material such as an aluminum can, a steel can, a container bag, and a laminated film bag, as long as the gas permeability is low and contact with carbon dioxide and moisture can be prevented. The atmosphere inside the storage container can be an inert gas atmosphere containing no carbon dioxide and moisture, or a reduced-pressure atmosphere with a high vacuum degree.

According to the above manufacturing method, the firing temperature, the firing time, the atmosphere, and the like are adjusted to reduce the amount of lithium carbonate remaining in the lithium composite compound at the end of firing, and in the subsequent steps, the reaction with carbon dioxide and moisture in the atmosphere can prevent impurities such as lithium carbonate and lithium hydroxide from being mixed. Specifically, if the amount of lithium carbonate has been reduced to 0.4% by mass or less at the end of the firing step S20, appropriately performing the washing step S30, the drying step S40, and the sealing step S50 makes it possible to maintain the amount of lithium carbonate eluted by immersion in pure water at 0.4% by mass or less. Therefore, the cathode active material having a high breaking strength of the secondary particles can be used for manufacturing a lithium ion secondary battery.

For the cathode active material, the amount of lithium carbonate eluted, amount of lithium hydroxide eluted, and moisture content can be confirmed by collecting the cathode active material immediately after manufacture or the cathode active material sealed in a storage container in a sample container such as a titration cell under an inert gas atmosphere, and subjecting it to neutralization titration or coulometric titration. Opening of the storage container and transfer to the sample container are preferably carried out in a glove box introduced with an inert gas such as argon gas. In the coulometric titration for measuring the moisture content, when dissolution in the electrolytic solution is difficult, the moisture vaporization method may be used in an appropriate temperature rising range.

<Lithium Ion Secondary Battery>

Next, a lithium ion secondary battery, whose cathode comprising the cathode active material used for a lithium ion secondary battery, will be explained below.

Figure 2:
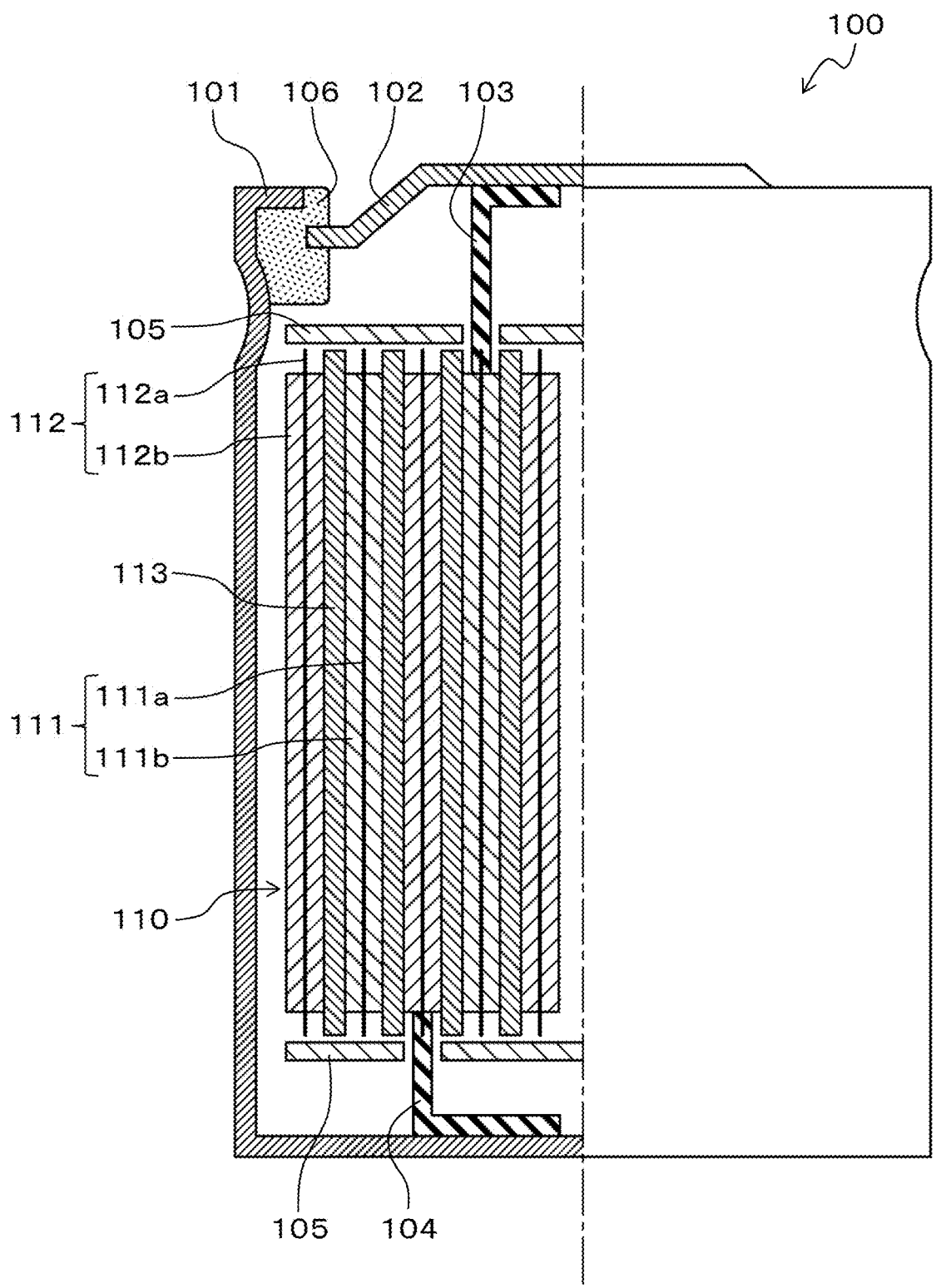
FIG. 2 is a partial cross-sectional view schematically illustrating an example of a lithium ion secondary battery.

FIG. 2 is a partial cross-sectional view schematically illustrating an exemplary lithium ion secondary battery. As illustrated in FIG. 2, a lithium ion secondary battery 100 according to the embodiment has a bottomed cylindrical battery can 101 that houses a nonaqueous electrolyte solution, a rolled electrode group 110 housed in the battery can 101, and a disk-like battery cover 102 that seals a top opening of the battery can 101.

The battery can 101 and battery cover 102 are typically made of a metal material such as stainless steel or aluminum. A cathode 111 has a cathode collector 111a, and a cathode mixture layer 111b formed on a surface of the cathode collector 111a. An anode 112 has an anode collector 112a, and an anode mixture layer 112b formed on a surface of the anode collector 112a.

The cathode collector 111a is typically made of metal foil, expanded metal or perforated metal, made of aluminum, an aluminum alloy or the like. The metal foil can have a thickness of approximately 15 μm or thicker and 25 μm or thinner, for example. The cathode mixture layer 111b contains a cathode active material used for a lithium ion secondary battery. The cathode mixture layer 111b is typically composed of a cathode mixture produced by mixing the cathode active material, a conductive material, a binder, and so forth.

The anode collector 112a is typically made of metal foil, expanded metal or perforated metal, made of copper, a copper alloy, nickel, a nickel alloy or the like. The metal foil may have a thickness of approximately 7 μm or thicker and 10 μm or thinner, for example. The anode mixture layer 112b contains an anode active material used for a lithium ion secondary battery. The anode mixture layer 112b is composed of a anode mixture produced by mixing the anode active material, a conductive material, a binder and so forth.

The anode active material employable here can be any of appropriate types of those having been used for an ordinary lithium ion secondary battery. Specific examples of the anode active material include natural graphite; graphitizable materials derived from petroleum coke, pitch coke and so forth, and fired at high temperatures such as 2500° C. or above; mesophase carbon; amorphous carbon; graphite covered with amorphous carbon; carbon materials derived from natural graphite or artificial graphite, with the surface mechanically processed to degrade the crystallinity; carbon materials having organic substance such as polymer, covering on or adhering to the surface; a carbon fiber; metal lithium; alloys of lithium with aluminum, tin, silicon, indium, gallium or magnesium; materials composed of a silicon particle or a carbon particle having metal immobilized on its surface; and oxides of tin, silicon, lithium and titanium. Metals to be immobilized are, for example, lithium, aluminum, tin, indium, gallium, magnesium, and alloys of these metals.

The conductive material may be any of appropriate types of those having been used for an ordinary lithium ion secondary battery. Specific examples of the conductive material include a carbon particle of graphite, acetylene black, furnace black, thermal black, and channel black; and a carbon fiber such as pitch-based and polyacrylonitrile (PAN)-based ones. A single type of these conductive materials may be used independently, or two or more types may be used in a combined manner. An amount of the conductive material can typically be 3% by mass or more and 10% by mass or less, relative to the whole mixture.

The binder may be any of appropriate types of those having been used for an ordinary lithium ion secondary battery. Specific examples of the binder include polyvinylidene fluoride (PVDF), polytetrafluoroethylene, polyhexafluoropropylene, styrene-butadiene rubber, polyacrylonitrile, and modified polyacrylonitrile. A single type of these binders may be used independently, or two or more types may be used in a combined manner. Additionally, a thickening binder such as carboxymethyl cellulose may be used in a combined manner. An amount of the binder can be 2% by mass or more and 10% by mass or less, relative to the whole mixture, for example.

The cathode 111 and the anode 112 may be, for example, manufactured according to any of generally used methods for manufacturing electrodes for an ordinary lithium ion secondary battery. The electrodes may be manufactured, for example, through a mixture preparation step in which an active material, a conductive material, and a binder are mixed in a solvent to prepare an electrode mixture; a mixture coating step in which the thus prepared electrode mixture is coated over a substrate such as a current collector, and then dried to form an electrode mixture layer; and a molding step in which the electrode mixture layer is to be press molded.

A mixing means for mixing the materials in the mixture preparation step, employable is appropriate mixing apparatuses such as a planetary mixer, a disper mixer, and a rotation-revolution mixer. As the solvent, depending on the kind of a binder can be, for example, N-methylpyrrolidone, water, N,N-dimethylformamide, N,N-dimethylacetamide, methanol, ethanol, propanol, isopropanol, ethylene glycol, diethylene glycol, glycerin, dimethyl sulfoxide, tetrahydrofuran, and the like can be used.

As means for coating the thus produced slurry-like electrode mixture in the mixture coating step, employable are appropriate coating apparatuses such as a bar coater, a doctor blade, and a roll transfer machine. A means for drying the thus coated electrode mixture, employable is appropriate drying apparatuses such as a hot air heater and a radiation heater.

A means for pressure molding the electrode mixture layer in the molding step, employable is appropriate pressure apparatuses such as a roll press. The cathode mixture layer 111b can have a thickness of, for example, approximately 100 μm or thicker and 300 μm or thinner. On the other hand, the anode mixture layer 112b may typically have a thickness of, for example, approximately 20 μm or thicker and 150 μm or thinner. The pressure molded electrode mixture layer may be cut, as necessary, together with the cathode collector, to produce an electrode for a lithium ion secondary battery with a desired shape.

The rolled electrode group 110 is formed, as illustrated in FIG. 2, by rolling up the strip-like cathode 111 and the anode 112, while placing a separator 113 in between. The rolled electrode group 110 is typically wound around a core made of polypropylene, polyphenylene sulfide or the like, and housed inside the battery can 101.

As the separator 113, employable are microporous films made of polyolefin resins such as polyethylene, polypropylene, and polyethylene-polypropylene copolymer, a polyamide resin, and an aramid resin; and these microporous films with a heat resistant substance such as an alumina particle coated on their surfaces.

As illustrated in FIG. 2, the cathode collector 111a is electrically connected through a cathode lead tab 103 to the battery cover 102. Meanwhile, the anode collector 112a is electrically connected through a anode lead tab 104 to the bottom of the battery can 101. Individually between the rolled electrode group 110 and the battery cover 102, and, between the rolled electrode group 110 and the bottom of the battery can 101, there are disposed insulation plates 105 to prevent short circuit. The cathode lead tab 103 and the anode lead tab 104 are made of materials same as those for the cathode collector 111a and the anode collector 112a, respectively, and are respectively joined to the cathode collector 111a and the anode collector 112a, by spot welding, ultrasonic welding or the like.

A nonaqueous electrolyte solution is injected into the battery can 101. The nonaqueous electrolyte solution may be injected by a method according to which the solution is directly injected, with the battery cover 102 kept open, or by a method according to which the solution is injected through an injection port provided to the battery cover 102, with the battery cover 102 kept closed. The battery can 101 is closed by the battery cover 102 fitted thereto typically by caulking. A sealant 106 made of an insulating resin material is placed between the battery can 101 and the battery cover 102, so as to electrically isolate the battery can 101 and the battery cover 102.

The nonaqueous electrolyte solution contains an electrolyte and a nonaqueous solvent. For the electrolyte, employable are, for example, various types of lithium salt such as LiPF6, LiBF4 and LiClO4. For the nonaqueous solvent, employable are, for example, chain carbonates such as dimethyl carbonate, diethyl carbonate, and ethyl methyl carbonate; cyclic carbonates such as ethylene carbonate, propylene carbonate, and vinylene carbonate; chain carboxylic esters such as methyl acetate, ethyl methyl carbonate, and methyl propyl carbonate; cyclic carboxylic esters such as γ-butyrolactone, and γ-valerolactone; and ethers. Concentration of the electrolyte can be, for example, typically 0.6 M or greater and 1.8 M or less.

The nonaqueous electrolyte solution may contain various additives added thereto, for the purpose of inhibiting oxidative decomposition or reductive decomposition of the electrolyte solution, preventing deposition of metal elements, improving ionic conductivity, or improving flame retardancy. Such additives are exemplified by organophosphorus compounds such as trimethyl phosphate, and trimethyl phosphite; organosulfur compounds such as 1,3-propanesultone, and 1,4-butanesultone; carboxylic anhydrides such as polyadipic anhydride and hexahydrophthalic anhydride; and boron compounds such as trimethyl borate, and lithium bis(oxalato)borate.

The thus assembled lithium ion secondary battery 100 uses the battery cover 102 as a cathode external terminal, and the bottom of the battery can 101 as an anode external terminal, and can thereby store externally fed electric power in the rolled electrode group 110. The lithium ion secondary battery 100 also can supply the electric power stored in the rolled electrode group 110 to external devices and so forth. The lithium ion secondary battery 100, although illustrated here as being cylindrical, is not specifically limited regarding a shape, instead allowing for other appropriate shapes including square, button, laminated sheet, and the like.

The lithium ion secondary battery 100 is applicable to various applications such as small-sized power sources for mobile electronic devices and home electric appliances; stationary power sources such as power storage device, uninterruptible power supply, and power leveling device, as well as driving power sources for vessels, railway vehicles, hybrid railway vehicles, hybrid cars, and electric cars.

EXAMPLES

The present invention will be described specifically, referring to embodiment examples, without limiting a technical scope of the present invention.

Embodiment Example 1

First, lithium carbonate, nickel hydroxide, cobalt carbonate, and manganese carbonate were prepared as starting materials. Next, the starting materials were weighed so as to adjust the atomic ratio of Li:Ni:Co:Mn to 1.04:0.80:0.10:0.10, and were ground with a grinder and wet mixed to prepare a slurry (mixing step S10).

Subsequently, the produced slurry was dried with a spray dryer, and then the dried mixture was fired to produce a fired powder of a lithium composite compound (firing step S20). Specifically, 300 g of the mixture produced by drying the slurry was filled into an alumina container having a length of 300 mm, a width of 300 mm, and a height of 100 mm, and fired using a continuous transfer furnace at 350° C. for 1 hour in the air to produce a first precursor (first firing step S21). Then, the first precursor was fired at 650° C. for 4 hours in an oxygen stream using a firing furnace subjected to replacement with an atmosphere having an oxygen concentration of 99% or more to produce a second precursor (second firing step S22). Thereafter, the second precursor was fired at 880° C. for 1 hour in an oxygen stream using a firing furnace subjected to replacement with an atmosphere having an oxygen concentration of 99% or more to produce a lithium composite compound (third firing step S23). The produced fired powder of the lithium composite compound was classified to a mesh of 53 μm or less to form the cathode active material as the sample.

Subsequently, 40 g of the produced cathode active material was immediately put into a filter, and 20 mL of pure water was poured thereon (washing step S30). Then, reduced pressure filtration was performed, and the filtered cathode active material was dried in a vacuum at 80° C. for 14 hours, and then dried in a vacuum at 240° C. for 14 hours (drying step S40). The lithium composite compound produced by firing was kept from contact with the air as much as possible until drying was completed, and was stored in a storage container until the following measurement was performed.

Embodiment Example 2

A cathode active material was produced in the same manner as in Embodiment Example 1, except that the particle size of the cathode active material was changed, and the washing step S30 and the drying step S40 were not performed.

Embodiment Example 3

A cathode active material was produced in the same manner as in Embodiment Example 2, except that the firing temperature in the third firing step S23 was set to 825° C.

Embodiment Example 4

A cathode active material was produced in the same manner as in Embodiment Example 1, except that the starting material of the cathode active material was weighed such that the atomic ratio of Li:Ni:Co:Mn was 1.04:0.80:0.15:0.05, the particle size of the cathode active material was changed, and the washing step S30 was performed by pouring 5 mL of pure water into 10 g of the cathode active material.

Embodiment Example 5

A cathode active material was produced in the same manner as in Embodiment Example 4, except that the firing time in the third firing step S23 was 3 hours, the particle size of the cathode active material was changed, and the washing step S30 and the drying step S40 were not performed.

Embodiment Example 6

A cathode active material was produced in the same manner as in Embodiment Example 4, except that the particle size of the cathode active material was changed.

Embodiment Example 7

A cathode active material was produced in the same manner as in Embodiment Example 4, except that the particle size of the cathode active material was changed, and the washing step S30 and the drying step S40 were not performed.

Embodiment Example 8

A cathode active material was produced in the same manner as in Embodiment Example 4, except that the particle size of the cathode active material was changed, the washing step S30 was performed by pouring 20 mL of pure water into 40 g of the cathode active material, and drying was performed at 80° C. for 14 hours in the drying step S40 and then at 190° C. for 14 hours.

Embodiment Example 9

A cathode active material was produced in the same manner as in Embodiment Example 8, except that the particle size of the cathode active material was changed.

Embodiment Example 10

A cathode active material was produced in the same manner as in Embodiment Example 8, except that the particle size of the cathode active material was changed.

Embodiment Example 11

A cathode active material was produced in the same manner as in Embodiment Example 8, except that the particle size of the cathode active material was changed, and drying was performed at 80° C. for 14 hours in the drying step S40 and then at 240° C. for 14 hours.

Embodiment Example 12

A cathode active material was produced in the same manner as in Embodiment Example 11, except that the particle size of the cathode active material was changed.

Embodiment Example 13

A cathode active material was produced in the same manner as in Embodiment Example 7, except that the particle size of the cathode active material was changed.

Embodiment Example 14

A cathode active material was produced in the same manner as in Embodiment Example 2, except that titanium oxide was further used as a starting material of the cathode active material, the starting materials were weighed such that the atomic ratio of Li:Ni:Co:Mn:Ti was 1.02:0.90:0.03:0.05:0.02, the firing temperature in the third firing step S23 was set to 860° C., and the particle size of the cathode active material was changed.

Embodiment Example 15

A cathode active material was produced in the same manner as in Embodiment Example 14, except that the firing temperature in the third firing step S23 was 850° C., the firing time in the third firing step S23 was 2 hours, and the particle size of the cathode active material was changed.

Comparative Example 1

A cathode active material was produced in the same manner as in Embodiment Example 2, except that the firing temperature in the third firing step S23 was set to 750° C. and the particle size of the cathode active material was changed.

Comparative Example 2

A cathode active material was produced in the same manner as in Embodiment Example 2, except that the firing temperature in the third firing step S23 was set to 725° C. and the particle size of the cathode active material was changed.

(Granularity and Aspect Ratio of Cathode Active Material)

The average particle size ($D_1$) of the primary particles constituting the cathode active material and the aspect ratio of the secondary particles were measured by observation with an electron microscope. As the electron microscope, a field emission scanning electron microscope "S-4700" (manufactured by Hitachi High-Technologies Corporation) was used to observe the cathode active material at an acceleration voltage of 5.0 kV and a magnification of 3000 times, 10 particles were extracted in the order of particle sizes close to the median, and the minor axis diameters and the major axis diameters of these primary particles and secondary particles were measured. The average particle size of the primary particles was determined as a biaxial average diameter from the minor axis diameters and the major axis diameters. In addition, the aspect ratio was determined by dividing the major axis diameter of the secondary particles by the minor axis diameter. The average particle size and aspect ratio of the primary particles were determined by averaging using the number of sample particles, 10. In addition, the average particle size ($D_2$) of the secondary particles was determined by using a laser diffraction/scattering type particle size distribution analyzer to measure the 50% particle size in the volume-based integrated particle size distribution of the secondary particles.

(Measurement of Composition, Specific Surface Area, and Moisture Content of Cathode Active Material)

The composition of the cathode active material was analyzed using an ICP emission spectrometer "OPTIMA 8300" (manufactured by PerkinElmer). Note that the analysis samples were prepared by dissolving the cathode active material in aqua regia. In addition, the specific surface area of the cathode active material was determined by a BET method using an automatic specific surface area measuring apparatus "BELCAT" (manufactured by BEL Japan, Inc.). Additionally, the moisture content of the cathode active material after firing and after drying was measured using a Karl Fischer moisture measuring apparatus "VA-100/CA-100" (manufactured by Mitsubishi Chemical Analytech Co., Ltd.).

(Open Pore Volume Ratio)

The open pore volume ratio of the secondary particles constituting the cathode active material was measured by a mercury intrusion method using a porosimeter "Autopore Model 9520" (manufactured by Shimadzu Corporation). In a measurement cell, 0.5 g of the cathode active material was accommodated to measure the volume distribution of the open pores in a range corresponding to a pore diameter of from 0.1 μm to 0.5 μm both inclusive. Then, the open pore volume ratio was calculated from the product with the apparent density of the secondary particles.

(Amount of Lithium Carbonate Eluted)

The amount of lithium carbonate eluted from the cathode active material was measured by neutralization titration using an automatic titrator "COM-1700A" (manufactured by Hiranuma Sangyo Co., Ltd.). First, 0.5 g of the cathode active material was dispersed in 30 mL of pure water bubbled with argon gas. After the dispersion liquid was stirred for 60 minutes, the filtrate was collected by suction filtration, and the filtrate was titrated with hydrochloric acid. The titration curve is in two stages, in which the portion up to the first equivalent point corresponds to the total amount of hydroxide ions of lithium hydroxide and carbonate ions of lithium carbonate, and the portion from the first equivalent point to the second equivalent point corresponds to the amount of hydrogen carbonate ions generated from the carbonate ions. Therefore, the amount (% by mass) of lithium carbonate was calculated from the titer from the first equivalent point to the second equivalent point.

(Particle Breaking Strength of Secondary Particles)

The particle breaking strength of the secondary particles constituting the cathode active material was measured using a micro compression tester "MCT-510" (manufactured by Shimadzu Corporation). A small amount of the cathode active material was sprayed on the pressure plate, and the indenter was pushed into one particle at a test force of 49 mN and a load rate of 0.4747 mN/sec. The load when the secondary particles were crushed was determined as the breaking strength.

(Coatability and Discharge Capacity of Cathode Active Material)

The cathode active material was used to prepare a cathode and a lithium ion secondary battery, and the coatability of the cathode active material and the discharge capacity of the lithium ion secondary battery were evaluated. First, the cathode active material, a binder, and a conductive material were mixed to prepare a cathode mixture slurry. Then, the cathode mixture slurry was coated on a current collector made of aluminum foil having a thickness of 20 μm, and dried at 120° C. to form a cathode mixture layer, which was thereafter compression molded with a press to an electrode density of 2.6 g/cm$^3$, and punched into a disk having a diameter of 15 mm to prepare a cathode. Here, the coatability of the cathode active material was evaluated by visually observing the state of adhesion between the cathode mixture layer and the current collector. Specifically, a rating of "○" was given to the case of no flaking of the cathode mixture layer, and a rating of "X" was given to the case where the flaked area spread over the entire cathode mixture layer and thus a contact area of the electrode could not be secured.

In addition, lithium metal was used as an anode active material to prepare an anode. Thereafter, the prepared cathode and anode were used to prepare lithium ion secondary batteries. The nonaqueous electrolyte solution used was a solution in which LiPF$_6$ was dissolved to a concentration of 1.0 mol/L in a solvent produced by mixing ethylene carbonate and dimethyl carbonate to a volume ratio of 3:7. For each of the prepared lithium ion secondary batteries, the charging was performed at a constant current and a constant voltage up to a charging end voltage (4.3 V) with a charging current of 0.2 CA, and the discharging was performed at a constant current up to a discharge end voltage (3.3 V or 2.5 V) with a discharge current of 0.2 CA. In this way, the discharge capacity was measured.

Table 1 presents the results of the chemical compositions of the cathode active materials according to Embodiment Examples and Comparative Examples, the average particle size ($D_1$) of the primary particles, the average particle size ($D_2$) of the secondary particles, the ratio ($D_1/D_2$) between the average particle size ($D_1$) of the primary particles and the average particle size ($D_2$) of the secondary particles, the firing temperature and the firing time (the firing temperature and the firing time in the third firing step S23), the presence or absence of water washing and drying (the amount of cathode active material powder and pure water used in the washing step S30, and the drying temperature and the drying time in the drying step S40, with "-" not carried out), the moisture content after firing and after drying, the aspect ratio of the secondary particles, the specific surface area, the open pore volume ratio, the amount of lithium carbonate eluted, the particle breaking strength, the coatability, and the discharge capacity.

TABLE 1

| | Chemical Composition | Average Particle Size Primary Particle (D1) [μm] | Average Particle Size Secondary Particle (D2) [μm] | Ratio (D1/D2) | Firing Temperature [°C] | Firing Time [h] | Washing | Drying | Moisture Content [ppm] | Aspect Ratio | Specific Surface Area [m²/g] | Open Pore Volume Ratio [%] | Amount of Lithium Carbonate Eluted [% by Mass] | Particle Breaking Strength [MPa] | Coatability | Discharge Capacity 4.3-3.3 V 0.2 CA | Discharge Capacity 4.3-2.5 V 0.2 CA [Ah/kg] |
|---|---|---|---|---|---|---|---|---|---|---|---|---|---|---|---|---|---|
| Embodiment Example 1 | Li: 1.04 Ni: 0.8 Co: 0.1 Mn: 0.1 | 1.2 | 12 | 0.1 | 880 | 1 | Powder: 40 g Pure Water: 20 mL | 80° C. × 14 h →240° C. × 14 h | 230 | 0.92 | 0.58 | 0 | 0.13 | 86 | ○ | 176 | — |
| Embodiment Example 2 | | 1.6 | 10 | 0.16 | 880 | 1 | — | — | 450 | 0.93 | 0.23 | 0 | 0.15 | 76 | ○ | 176 | — |
| Embodiment Example 3 | | 0.3 | 12 | 0.025 | 825 | 1 | — | — | — | 0.93 | 0.96 | 7 | 0.29 | 45 | ○ | 190 | — |
| Embodiment Example 4 | Li: 1.04 Ni: 0.8 Co: 0.15 Mn: 0.05 | 0.72 | 5 | 0.144 | 880 | 1 | Powder: 10 g Pure Water: 5 mL | 80° C. × 14 h →240° C. × 14 h | 450 | 0.94 | 0.58 | 0 | 0.29 | 45 | ○ | — | 190 |
| Embodiment Example 5 | | 1.16 | 12 | 0.097 | 880 | 3 | — | — | 200 | 0.94 | 0.24 | 0 | 0.12 | 51 | ○ | — | 191 |
| Embodiment Example 6 | | 1.03 | 12 | 0.086 | 880 | 1 | Powder: 10 g Pure Water: 5 mL | 80° C. × 14 h →240° C. × 14 h | 460 | 0.95 | 0.61 | 0 | 0.14 | 61 | ○ | — | 190 |
| Embodiment Example 7 | | 0.76 | 12 | 0.063 | 880 | 1 | — | — | 190 | 0.94 | 0.23 | 0 | 0.17 | 95 | ○ | — | 189 |
| Embodiment Example 8 | | 0.72 | 13 | 0.055 | 880 | 1 | Powder: 40 g Pure Water: 20 mL | 80° C. × 14 h →190° C. × 14 h | 300 | 0.93 | 0.55 | 0 | 0.17 | 59 | ○ | — | 189 |
| Embodiment Example 9 | | 1.0 | 13 | 0.077 | 880 | 1 | Powder: 40 g Pure Water: 20 mL | 80° C. × 14 h →190° C. × 14 h | 430 | 0.94 | 0.64 | 0 | 0.23 | 48 | ○ | — | 188 |
| Embodiment Example 10 | | 0.74 | 13 | 0.057 | 880 | 1 | Powder: 40 g Pure Water: 20 mL | 80° C. × 14 h →190° C. × 14 h | 450 | 0.95 | 0.59 | 0 | 0.15 | 62 | ○ | — | 189 |
| Embodiment Example 11 | | 0.75 | 14 | 0.054 | 880 | 1 | Powder: 40 g Pure Water: 20 mL | 80° C. × 14 h →240° C. × 14 h | 260 | 0.94 | 0.57 | 0 | 0.086 | 98 | ○ | — | 190 |
| Embodiment Example 12 | | 0.74 | 14 | 0.053 | 880 | 1 | Powder: 40 g Pure Water: 20 mL | 80° C. × 14 h →240° C. × 14 h | 200 | 0.94 | 0.42 | 0 | 0.087 | 89 | ○ | — | 189 |
| Embodiment Example 13 | | 0.6 | 11 | 0.055 | 880 | 1 | — | — | 370 | 0.94 | 0.58 | 0 | 0.156 | 82 | ○ | — | 193 |
| Embodiment Example 14 | Li: 1.02 Ni: 0.9 Co: 0.03 Mn: 0.05 Ti: 0.02 | 0.62 | 12 | 0.052 | 860 | 1 | — | — | 220 | 0.94 | 0.28 | 0 | 0.191 | 60 | ○ | — | 200 |
| Embodiment Example 15 | | 0.53 | 11 | 0.048 | 850 | 1 | — | — | 210 | 0.94 | 0.23 | 0 | 0.163 | 68 | ○ | — | 189 |
| Comparative Example 1 | Li: 1.04 Ni: 0.8 Co: 0.1 Mn: 0.1 | 0.07 | 16 | 0.004 | 750 | 1 | — | — | 1800 | 0.91 | 1.43 | 25 | 0.45 | 25 | X | — | — |
| Comparative Example 2 | | 0.06 | 12 | 0.005 | 725 | 1 | — | — | 2500 | 0.93 | 1.89 | 28 | 0.53 | 19 | X | — | — |

Figure 3:
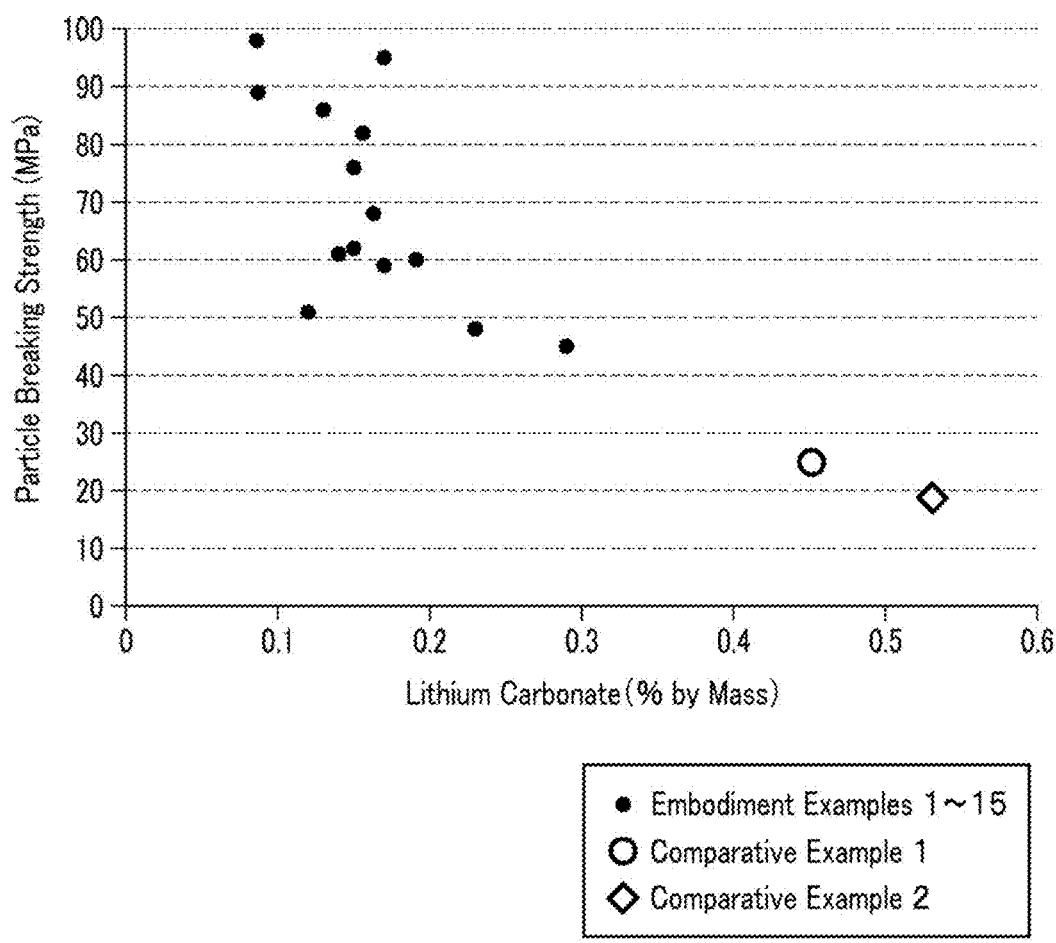
FIG. 3 is a diagram illustrating the relationship between the amount of lithium carbonate eluted from the cathode active material according to an embodiment example and the particle breaking strength.

FIG. 3 is a diagram illustrating the relationship between the amount of lithium carbonate eluted from the cathode active material according to an embodiment example and the particle breaking strength.

As illustrated in FIG. 3, it can be understood that, as the amount of lithium carbonate eluted by immersing the cathode active material in pure water decreases, the particle breaking strength of the secondary particles constituting the cathode active material increases. According to FIG. 3, it can be seen that a particle breaking strength of 30 MPa or more can be obtained when the amount of lithium carbonate eluted is 0.4% by mass or less.

In addition, as illustrated in Table 1, when the ratio ($D_1/D_2$) between the average particle size ($D_1$) of the primary particles and the average particle size ($D_2$) of the secondary particles is in the range of 0.006 or more and 0.25 or less, the amount of lithium carbonate eluted is reduced, so that a particle breaking strength of at least 30 MPa or more is obtained. The amount of lithium carbonate eluted and the particle breaking strength generally show a correlation with the particle size ratio ($D_1/D_2$), the specific surface area, and the open pore volume ratio. A comparison between Embodiment Examples having equivalent particle size ratios ($D_1/D_2$), specific surface areas, and open pore volume ratios gives a speculation that the amount of lithium carbonate eluted greatly affects the particle breaking strength. For example, the particle breaking strength is higher in Embodiment Example 1 with water washing than in Embodiment Example 2 closer to single particles than Embodiment Example 1, from which it can be understood that the resistance of the secondary particles to external force can be improved by reducing the amount of lithium carbonate eluted without making the particles constituting the cathode active material close to single particles. Embodiment Examples 11 and 12 have particle size ratios ($D_1/D_2$), specific surface areas, and open pore volume ratios equivalent to other Embodiment Examples, but exhibit a small amount of lithium carbonate eluted and a high particle breaking strength.

Figure 4:
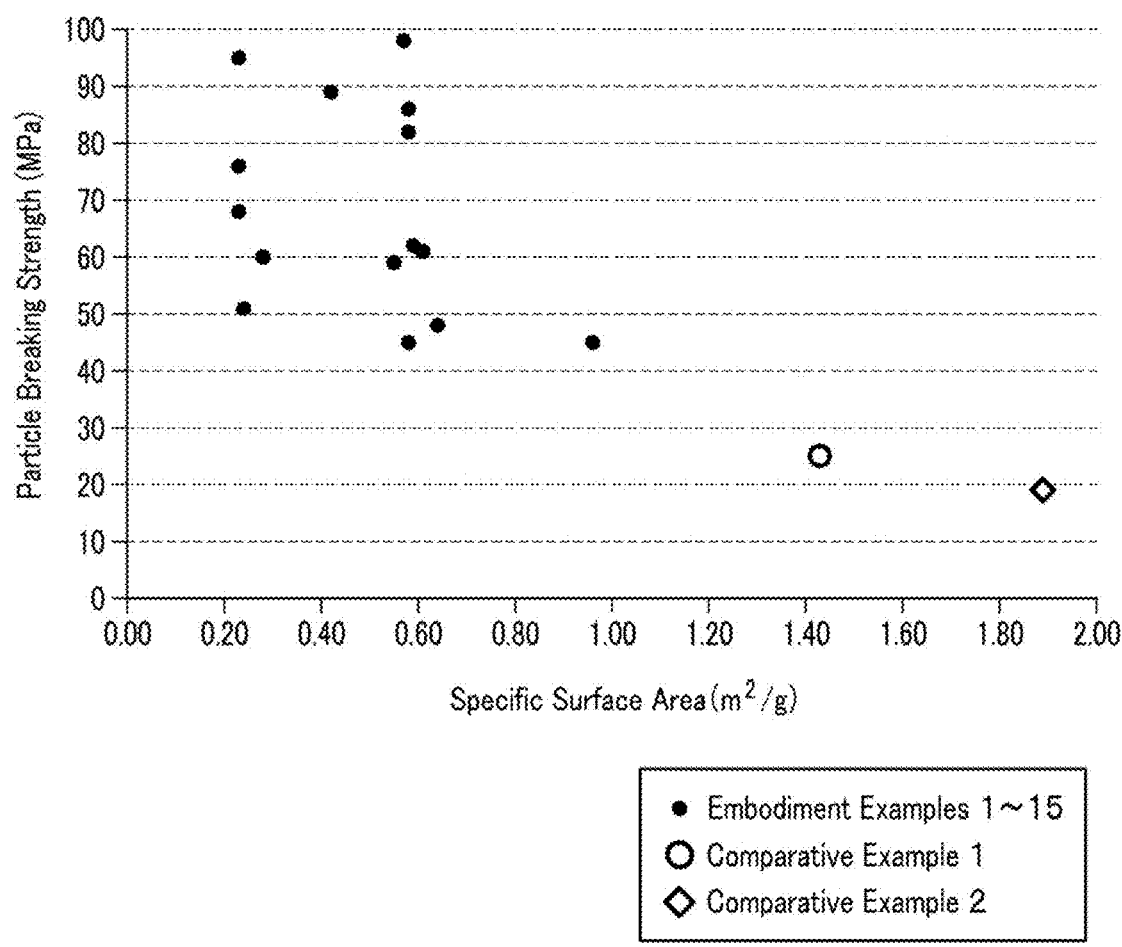
FIG. 4 is a diagram illustrating the relationship between the specific surface area of the cathode active material according to an embodiment example and the particle breaking strength.

FIG. 4 is a diagram illustrating the relationship between the specific surface area of the cathode active material according to an embodiment example and the particle breaking strength.

As illustrated in FIG. 4, it can be understood that the specific surface area and particle breaking strength of the cathode active material exhibit a correlation similar to that in the case of the amount of lithium carbonate eluted, and the smaller the specific surface area, the higher the particle breaking strength of the secondary particles. However, it can be understood that the variation among Embodiment Examples 1 to 15 is relatively large, and the particle breaking strength is not determined only by the magnitude of the specific surface area. Consider the case of comparing Embodiment Examples 1 to 15 having a specific surface area of 1.20 $m^2/g$ or less and a lithium carbonate elution amount of 0.4% by mass or less with Comparative Examples 1 and 2 having a specific surface area exceeding 1.2 $m^2/g$ and a lithium carbonate elution amount exceeding 0.4% by mass. The coatability of the cathode active material was improved for Embodiment Examples 1 to 15 in which the specific surface area was small to some extent, the amount of lithium carbonate eluted was reduced, and the particle breaking strength was high. It is speculated that the improvement was due to the following, for example. Enhancement in particle breaking strength made it difficult to produce fine powder during coating of the cathode mixture, which improved adhesion between the particles of the cathode active material and the current collector, and made it difficult to break the secondary particles during pressure molding.

In addition, comparison of Embodiment Examples 1 and 2 and the like with Embodiment Example 3 shows that Embodiment Example 3 having a large specific surface area is inferior to Embodiment Examples 1 and 2 and the like in particle breaking strength, but has a high discharge capacity. When the firing temperature is low to some extent and the specific surface area and open pore volume ratio are large as in Embodiment Example 3, the reaction area is increased, so that a high discharge capacity can be obtained. It is considered that the particle breaking strength and coatability of such a cathode active material can be further improved by reducing the amount of lithium carbonate eluted by washing with water or the like.

Figure 5:
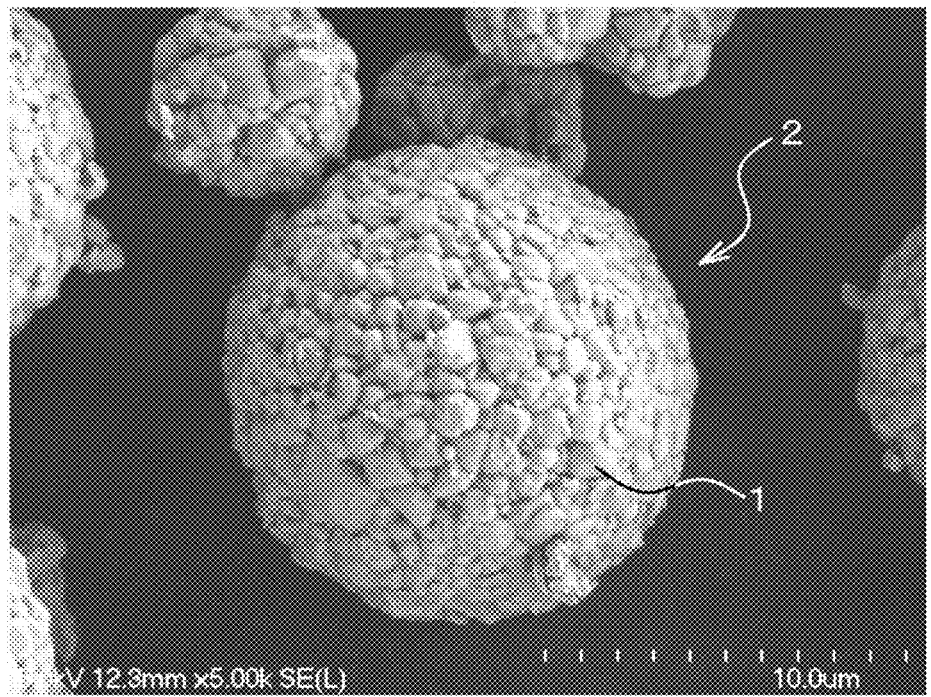
FIG. 5 is a scanning electron micrograph of the cathode active material according to Embodiment Example 3.

FIG. 5 is a scanning electron micrograph of the cathode active material according to Embodiment Example 3.

FIG. 5 illustrates a result of observing the prepared cathode active material powder according to Embodiment Example 3 using a scanning electron microscope at an acceleration voltage of 5.0 kV and a magnification of 5000. In FIG. 5, reference numeral 1 indicates the primary particles of the lithium composite compound, and reference numeral 2 indicates the secondary particles of the lithium composite compound.

As illustrated in FIG. 5, a cathode active material having a relatively small ratio ($D_1/D_2$) between the average particle size ($D_1$) of the primary particles and the average particle size ($D_2$) of the secondary particles is composed of a large number of fine particles, unlike the conventional cathode active material in which the particles constituting the secondary particles are close to single particles. Particles of such form tend to have a certain size of surface area and open pore volume ratio. However, it is considered that, if the amount of lithium carbonate eluted is reduced and the breaking strength of the secondary particles is improved, the coatability of the cathode active material can be improved to enhance the performance of the lithium ion secondary battery.

REFERENCE SIGNS LIST

100 Lithium ion secondary battery
101 Battery can
102 Battery cover
103 Cathode lead tab
104 Anode lead tab
105 Insulation plate
106 Sealant
110 Rolled electrode group
111 Cathode
111a Cathode current collector
111b Cathode mixture layer
112 Anode
112a Anode current collector
112b Anode mixture layer
113 Separator

The invention claimed is:
1. A cathode active material for a lithium ion secondary battery, comprising:
a primary particle of a lithium composite compound represented by the following formula (1); and
a secondary particle formed by an aggregation of primary particles of the lithium composite compound, wherein a ratio ($D_1/D_2$) between an average particle size ($D_1$) of the primary particles and an average particle size ($D_2$) of secondary particles is from 0.006 to 0.25 both inclusive, the cathode active material for a lithium ion secondary battery has a specific surface area from 0.2 m$^2$/g to 1.0 m$^2$/g both inclusive, an amount of lithium carbonate is from 0.08% by mass to 0.3% by mass both inclusive, a breaking strength of the secondary particle is 40 MPa or more, the secondary particle has an aspect ratio of from 0.6 to 1.0 both inclusive, the secondary particles have an open pore volume ratio which is determined by a mercury intrusion method and which is 20% or less in a pore diameter range of from 0.1 μm to 0.5 μm both inclusive, and the cathode active material for a lithium ion secondary battery has a moisture content of 250 ppm or less, $$Li_{1+a}Ni_xCo_yM1_{1-x-y-z}M2_zO_{2+\alpha} \quad (1)$$

provided that (a) in the formula (1), M1 is Mn, (b) M2 is Ti, and (c) a, x, y, z, and α are numbers satisfying $0.02 \leq a \leq 0.2$, $0.8 \leq x \leq 0.9$, $0.03 \leq y \leq 0.15$, $0 \leq z \leq 0.02$, $0.05 \leq 1-x-y-z \leq 0.1$, and $-0.2 \leq \alpha \leq 0.2$ respectively.

2. The cathode active material for a lithium ion secondary battery according to claim 1, wherein
the secondary particle has an aspect ratio of from 0.92 to 0.95 both inclusive.

3. The cathode active material for a lithium ion secondary battery according to claim 1, wherein the amount of the lithium carbonate is 0.08% by mass to 0.15% by mass both inclusive, and the breaking strength of the secondary particle is 60 MPa or more.

4. The cathode active material for a lithium ion secondary battery according to claim 1, wherein the secondary particles have an open pore volume ratio which is determined by a mercury intrusion method and which is less than 7% in a pore diameter range of from 0.1 μm to 0.5 μm both inclusive.

5. A lithium ion secondary battery comprising a cathode comprising the cathode active material for a lithium ion secondary battery according to claim 1.

6. A method for manufacturing a cathode active material for a lithium ion secondary battery, comprising:
a mixing step of producing a mixture by mixing lithium carbonate with compounds each containing a metal element shown in the following formula (1) other than Li; and
a firing step of producing a lithium composite compound represented by the following formula (1) by firing the mixture, wherein
the firing step includes
a first firing step of producing a first precursor by firing the mixture at firing temperature of from 200° C. to 400° C. both inclusive for from 0.5 hours to 5 hours both inclusive,
a second firing step of producing a second precursor by reacting 92% mass or more of the lithium carbonate by firing the first precursor at a firing temperature of from 450° C. and to 800° C. both inclusive for from 0.5 hours to 50 hours both inclusive in an oxidative atmosphere in which a carbon dioxide concentration is 5% or less,
a third firing step of producing the lithium composite compound by firing the second precursor at a firing temperature of from 755° C. to 900° C. both inclusive for from 0.5 hours to 50 hours both inclusive in an oxidative atmosphere in which a carbon dioxide concentration is 5% or less, and
a sealing step of sealing, after the third firing step, in a storage container the lithium composite compound having an amount of lithium carbonate from 0.08% by mass to 0.3% by mass both inclusive, and a moisture content of 250 ppm or less, and
wherein the atmosphere inside the storage container is an inert gas atmosphere, or a reduced-pressure atmosphere with a high vacuum degree, $$Li_{1+a}Ni_xCo_yM1_{1-x-y-z}M2_zO_{2+\alpha} \quad (1)$$

provided that (a) in the formula (1), M1 is Mn, (b) M2 is Ti, and (c) a, x, y, z, and α are numbers satisfying $0.02 \leq a \leq 0.2$, $0.8 \leq x \leq 0.9$, $0.03 \leq y \leq 0.15$, $0 \leq z \leq 0.02$, $0.05 \leq 1-x-y-z \leq 0.1$, and $-0.2 \leq \alpha \leq 0.2$ respectively.

7. The method for manufacturing a cathode active material for a lithium ion secondary battery according to claim 6, further comprising:
a washing step of washing the lithium composite compound with water after the third firing step; and
a drying step of drying the lithium composite compound washed with water, wherein
the drying step being performed before the lithium composite compound having an amount of lithium carbonate of 0.3% or less by mass and a moisture content of 250 ppm or less is sealed in the storage container.

8. The method for manufacturing a cathode active material for a lithium ion secondary battery according to claim 7, wherein the mixing step includes
a preparing step of preparing a mixed slurry through mixing by wet grinding, and
a granulating step of granulating the mixed slurry by spray drying.

9. The cathode active material for a lithium ion secondary battery according to claim 6, wherein
the secondary particle has an aspect ratio of from 0.92 to 0.95 both inclusive.

10. A cathode active material for a lithium ion secondary battery prepared by the method according to claim 6, wherein the amount of the lithium carbonate is 0.08% by mass to 0.15% by mass both inclusive, and the breaking strength of the secondary particle is 60 MPa or more.

11. The cathode active material for a lithium ion secondary battery according to claim 6, wherein the secondary particles have an open pore volume ratio which is determined by a mercury intrusion method and which is less than 7% in a pore diameter range of from 0.1 μm to 0.5 μm both inclusive.

12. The method for manufacturing a cathode active material for a lithium ion secondary battery according to claim 6, wherein the mixing step includes
a preparing step of preparing a mixed slurry through mixing by wet grinding, and
a granulating step of granulating the mixed slurry by spray drying.

13. A lithium ion secondary battery comprising a cathode comprising the cathode active material for a lithium ion secondary battery prepared by the method according to claim 6.

* * * * *